(12) United States Patent
Eguchi et al.

(10) Patent No.: US 6,941,501 B2
(45) Date of Patent: Sep. 6, 2005

(54) MULTICAST FILE TRANSMISSION METHOD

(75) Inventors: Kazuyuki Eguchi, Tokyo (JP); Masami Ishikura, Tokyo (JP)

(73) Assignee: KDDI Corporation, Tokyo (JP)

( * ) Notice: Subject to any disclaimer, the term of this patent is extended or adjusted under 35 U.S.C. 154(b) by 617 days.

(21) Appl. No.: 09/928,137

(22) Filed: Aug. 10, 2001

(65) Prior Publication Data

US 2002/0038441 A1 Mar. 28, 2002

(51) Int. Cl.⁷ .............................. H04L 1/18; H04L 1/08; H04L 12/18; G08C 25/02
(52) U.S. Cl. ........................ 714/751; 709/231; 714/748
(58) Field of Search ................................. 714/748, 751, 714/807–808; 709/231

(56) References Cited

U.S. PATENT DOCUMENTS

| | | | | | |
|---|---|---|---|---|---|
| 5,245,616 | A | * | 9/1993 | Olson .......................... | 714/748 |
| 6,154,771 | A | * | 11/2000 | Rangan et al. .............. | 709/231 |
| 6,359,877 | B1 | * | 3/2002 | Rathonyi et al. ........... | 709/237 |
| 6,574,795 | B1 | * | 6/2003 | Carr ............................ | 714/748 |
| 6,581,177 | B1 | * | 6/2003 | Segal et al. ................. | 714/751 |

OTHER PUBLICATIONS

The American Heritage® Dictionary of the English Language, Fourth Edition; Copyright © 2000 by Houghton Mifflin Company; entry for "routs".*

Lifan Gu; Garcia–Luna–Aceves, J.J.; New error recovery structures for reliable multicasting; Proceedings., Sixth International Conference on Computer Communications and Networks, 1997, Sep. 22–25, 1997; pp.: 189–196.*

* cited by examiner

*Primary Examiner*—R. Stephen Dildine
(74) *Attorney, Agent, or Firm*—Myron Greenspan, Esq.; Lackenbach Siegel, LLP

(57) ABSTRACT

A multicast file transmission method is disclosed, which permits efficient multicast file transmission with high reliability even in the communication system, which uses in the up-link direction a specified transmission circuit, such as a multiple access satellite communication circuit. In the multicast file transmission method, a data file is composed of a plurality of blocks from a sending side to respective receiving destinations. At respective destinations, a test is carried out to find whether or not any transmitted packet is erroneous in the data file composed of a plurality of blocks after the end of said transmission of the data file. To the sending side from any of the respective receiving destinations, where any transmitted packet is found erroneous by the testing in the data file composed of a plurality of blocks after the end of said transmission of the data file, a request-for-retransmission signal is transmitted for requesting retransmission of the transmitted packet of data found erroneous in the data file received at any of respective receiving destinations. The request-for-retransmission signal is defined to indicate the offset position of the erroneous data in the transmitted packet of data and the data length of the erroneous data.

2 Claims, 21 Drawing Sheets

FIG.4 SEQUENCE OF MULTI-DESTINATION RETRANSMISSION PHASE

SEQUENCE OF ACKNOWLEDGEMENT PHASE

BASIC PACKET FORMAT OF ANNOUNCE REGISTRATION PHASE

BASIC PACKET FORMAT OF MULTI-DESTINATION
DELIVERY PHASE

BASIC PACKET FORMAT OF MULTI-DESTINATION
RETRANSMISSION PHASE

BASIC PACKET FORMAT OF ACKNOWLEDGEMENT PHASE

HEADER FORMAT

DEFINITION OF CODE LENGTH

FORMAT OF MULTI-DESTINATION DELIVERY START ANNOUNCE PACKET

REGISTRATION PACKET

FORMAT OF FILE DATA PACKET AND MULTI-DESTINATION
RETRANSMISSION DATA PACKET

FORMATS OF MULTI-DESTINATION DELIVERY END PACKET AND
MULTI-DESTINATION RETRANSMISSION END PACKET

FORMATS OF MULTI-DESTINATION RETRANSMISSION START PACKET
AND MULTI-DESTINATION RETRANSMISSION END PACKET

FORMATS OF
RETRANSMISSION REQUEST PACKET AND
RETRANSMISSION REQUEST END PACKET

FORMAT OF ACKNOWLEDGEMENT START PACKET

FORMAT OF ACKNOWLEDGEMENT
ANSWER PACKET

FORMAT OF ACKNOWLEDGEMENT
END PACKET

FLOWCHART OF ANNOUNCE/REGISTRATION AND MULTI-DESTINATION DELIVERY PHASE (SENDING SIDE)

MULTICAST FILE TRANSMISSION METHOD

BACKGROUND OF THE INVENTION

The present invention relates to a method for multicasting a specified file to multiple destinations and, more particularly, to a method for multicasting the specified file to the multiple destinations via wireless links, such as a satellite communication circuit.

As prior art of this technical field, there is proposed an MFTP (Multicast File Transmission Protocol) system in which a transmitting station multicasts a specified file composed of a plurality of blocks, then a receiving station requests retransmission of a DTU (Data Transmission Unit) that could not be received, so that the transmitting station retransmits the requested DTU, thus completing the file transfer (as published in Japanese Pat. Pub. Gazette No. 512726/98).

FIG. 28A depicts a data transmission packet format transmitted in the MFTP system in a case where each file comprises blocks #1, #2, #3 and #4; each block is composed of frames #11 to #1N, and each frame including an MFTP-OH, which is an OH (overhead) for use in the communication path between a transmitting processor and a receiving processor in the MFTP system, and an MFTP-OH (option) for optional use. Each frame including the MFTP-OH (option) constitutes one DTU. This DTU, the METP-OH, a UDP (User Datagram Protocol)-OH and an IP-OH, which is an overhead for IP (Internet Protocol), constitute one MTU (Multicast Transmission Unit). FIG. 28B is a diagrammatic representation of a retransmission-requesting packet format in the MFTP system, which indicates received results for each bit in one DTU. In this example, each cross mark x indicates a result of non-reception.

The conventional MFTP system adopts a method which, during multicast transmission of a file, receives from a plurality of receiving stations response signals which indicate DTUs to be retransmitted. In the MFTP system, since data errors are expressed in the form of a bit map, even where only one DTU is erroneous, it is necessary that the receiving station sends back to the transmitting station a retransmission-requesting packet composed of a bit map (usually, of a size of one MTU (=1500 bytes)) corresponding to one block.

The MFTP system is usually applied to a communication system, whose communication circuits from a plurality of receiving stations to a transmitting station (denoted as "up-link direction") are dedicatedly allocated to communicate between an individual receiving station and the transmission station, such as conventional telephone circuits. However, since the total amount of data becomes large, the MFTP system has a serious drawback in terms of efficiency in retransmission processing on applying to a communication system, whose circuits in the up-link direction are shared on a multiple access basis, such as satellite communication circuit.

SUMMARY OF THE INVENTION

An object of the present invention is to provide a multicast file transmission method, which permits efficient multicast file transmission with high reliability even in the communication system, which uses in the up-link direction a specified transmission circuit, such as a multiple access satellite communication circuit.

To attain the above object, the multicast file transmission method according to the present invention, comprising:

transmitting a data file composed of a plurality of blocks from a sending side to respective receiving destinations;

testing, at said respective destinations, whether or not any transmitted packet is found erroneous in the data file composed of a plurality of blocks after the end of said transmission of the data file;

transmitting to said sending side from any of said receiving respective destinations, where any transmitted packet is found erroneous by said testing in the data file composed of a plurality of blocks after the end of said transmission of the data file, a request-for-retransmission signal for requesting retransmission of the transmitted packet of data found erroneous in said data file received at said any of respective receiving destinations, said request-for-retransmission signal being defined to indicate the offset position of said erroneous data in said transmitted packet of data and the data length of said erroneous data; and retransmitting the transmitted packet of data found erroneous from the sending side to said any of said respective receiving destinations in a multi-destination re-transmittal phase starting in response to said request-for-retransmission signal.

The request-for-retransmission signal can be defined to send, for example, a total of 8 bytes composed of 4 bytes representative of the offset position of said transmission packet of said erroneous data and 4 bytes representative of the length of said erroneous data.

BRIEF DESCRIPTION OF THE DRAWINGS

The present invention will be described in details below with reference to accompanying drawings, in which.

DETAILED DESCRIPTION

The features of the present invention are summarized as follows:

(1) Outlines of Functional Requirement for Protocol

① Transmission Method:

The transmission method used in the present invention is a limited delivery method (including acknowledgements), in which the sender performs confirmation of transmittal (hereinafter referred to "acknowledgement") for each of limited members who have been registered as "receivers" at the start of file transfer.

② Method for Acknowledgement:

The acknowledgement is carried out after establishing respective connection routes from the sender to the receivers. A centralized supervisory system is used in which a server for multi-destination delivery performs the acknowledgement for all receivers (having been registered).

③ Transmission Rate Setting Function:

This is a function which enables the sender to set the multicast transmission rate, under consideration of the transmission rate (line speed) and the number of receivers.

④ Destination Folder Specifying Function:

This is a function to specify a receiver's folder for storing the file to be delivered.

⑤ File's Validity Verifying Function:

This is a function for verifying the validity of a file transmission by performing a checksum testing on a packet-wise basis at the time of sending file data from the server to clients in a multi-destination delivery phase and a multi-destination retransmission phase.

The above functions will be described below in more detail.

(2) Protocol Stack

Figure 1:
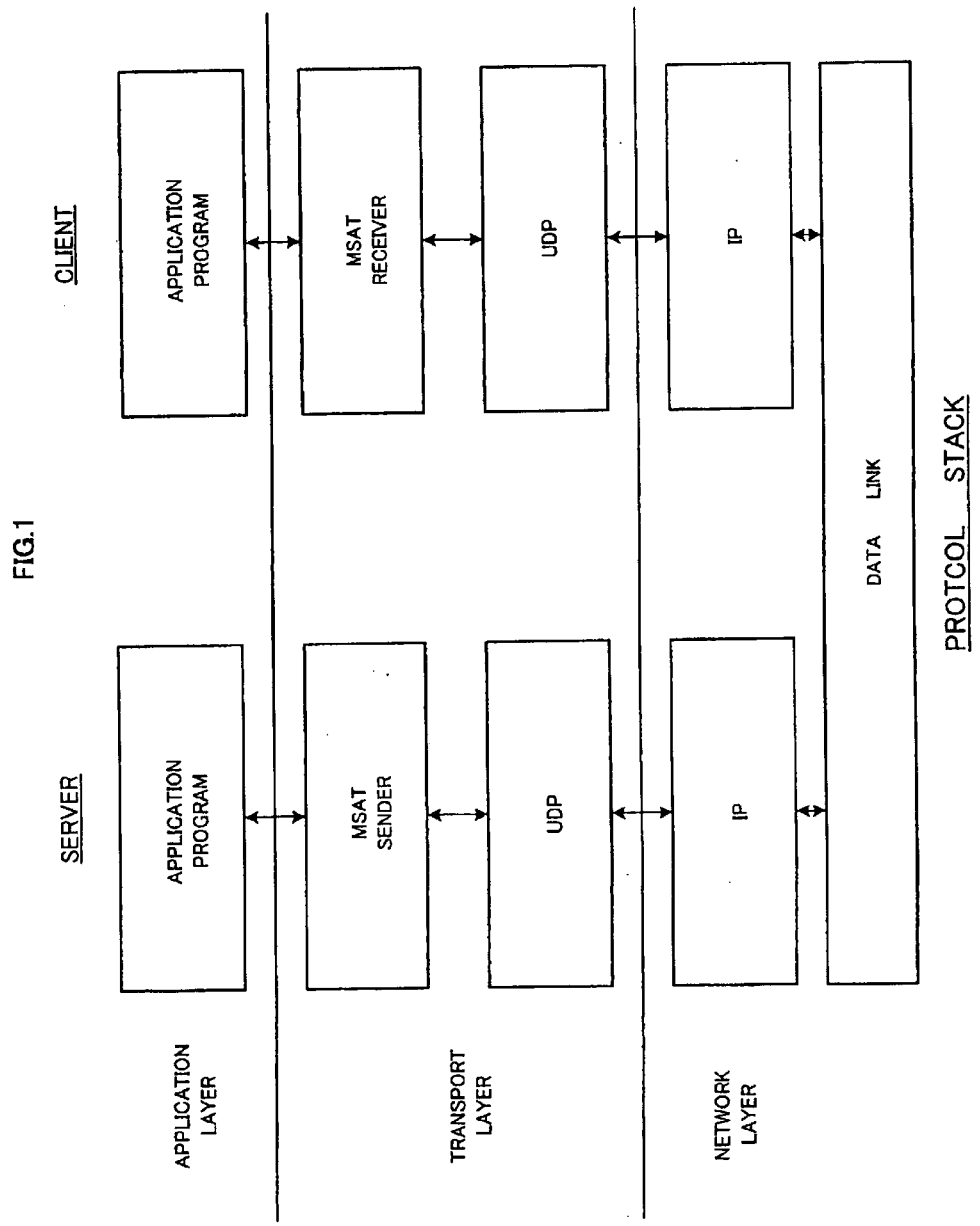
FIG. 1 is a diagram illustrating a protocol stack for use in the present invention.

FIG. 1 depicts a protocol stack of multicast file transfer software for implementing the present invention.

(3) Communication Procedure

The communication procedure is divided into: an "announce/registration phase" for delivering file transmission information; a "multi-destination delivery phase" for performing multi-destination delivery; a "multi-destination retransmission phase" for performing multi-destination retransmission; and a "acknowledgement phase" for carrying out acknowledgement. In all of the announce/registration phase, the multi-destination delivery phase and the multi-destination retransmission phase, the data transmission from the server to the clients is performed along multicast UDP transmission. On the other hand, the data transmission from the clients to the server in the announce/registration phase, the multi-destination retransmission phase and the acknowledgement phase and the data transmission from the server to the clients in the acknowledgement phase are performed along a unicast UDP transmission. The respective sequences are shown in FIGS. 2, 3, 4 and 5.

Figure 2:
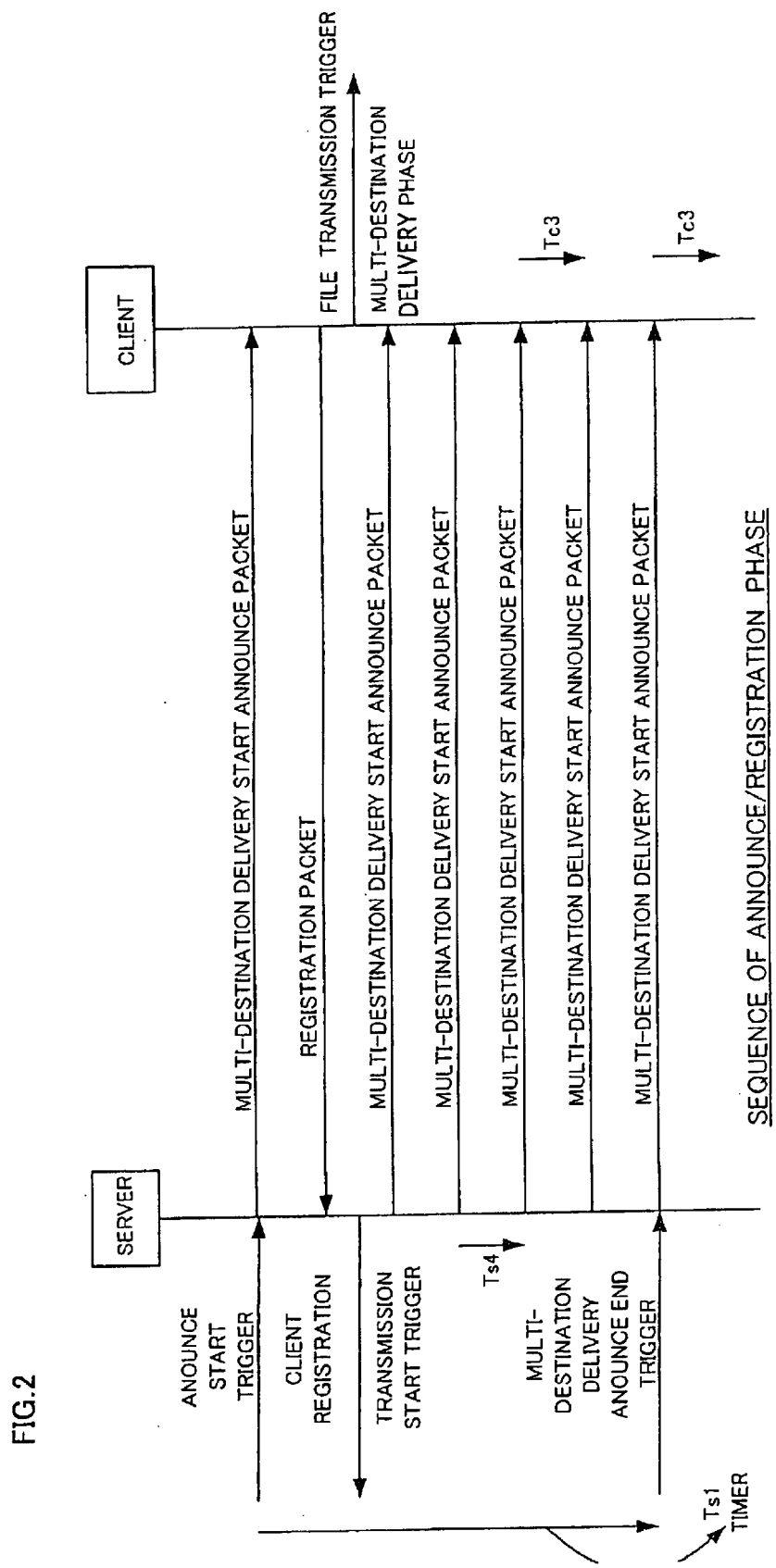
FIG. 2 is a diagram illustrating a sequence of an announce/registration phase for use in the present invention.

① Announce/Registration Phase:

With reference to FIG. 2, the server is triggered by a request for the start of transmission to send a "multi-destination delivery start announce packet" using a multicast IP address for announcement use. This packet includes, in addition to MF-common header information, the file name, the file size, the transmission rate, a multicast IP address for multi-destination data transmission and port number information of the file to be sent. After sending the first "multi-destination delivery start announce packet", the server sends the "multi-destination delivery start announce packet" at regular time intervals defined by a Ts4 timer. Having received a registration packet from each client belonging to a Group ID specified as the destination, or after a certain elapsed time (a Ts1 timer), the server uses them as a transmission start trigger to shift into the multi-destination delivery phase. Further, the server draws up an acknowledgement list in accordance with the contents of the packets received during the registration-receiving period, and has its validity checked by an Application Program (AP) prior to the start of the multi-destination retransmission phase.

The client receives a multi-destination transmission start announce packet and, if the client belongs into the Group ID, then after making an inquiry to the AP, sends back to the server a "registration packet" carrying a result of the inquiry (a registration code), thereafter proceeding to the multi-destination delivery phase. Incidentally, when a time-out occurs in a Tc3 timer which defines an inter-packet time-length, the program ends.

Figure 3:
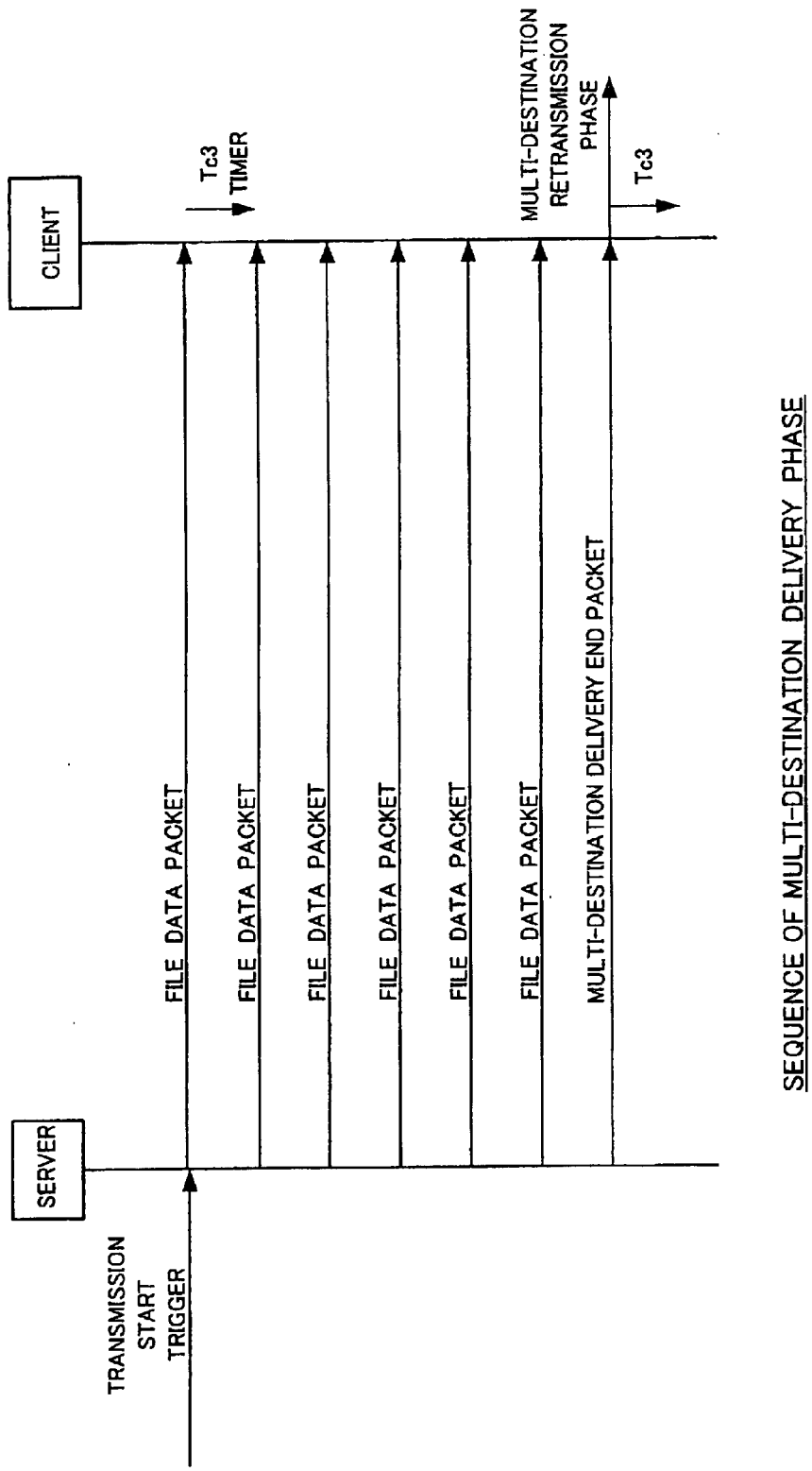
FIG. 3 is a diagram illustrating a sequence of a multi-destination delivery phase for use in the present invention.

② Multi-destination Delivery Phase:

With reference to FIG. 3, the server responds to the transmission start trigger to send a "file data packet". The "file data packet" carries an offset position in the file, a checksum value of file data information in the packet and the file data information. Accordingly, even if the client happens to become unable to receive the "file data packet" halfway through its reception, the client can continue data reception. Upon completion of the data transmission, the server sends a "multi-destination delivery end packet" and, when the validation of the acknowledgement list by the AP is already completed, the server proceeds to the multi-destination retransmission phase. Incidentally, the "file data packet" and the "multi-destination delivery end packet" are sent out via different port numbers.

On detecting an omission of the file data during reception of the "file data packet", the client draws up a list of data to be requested for retransmission. Upon each reception of the "file data packet" the client calculates the checksum value of the file data received and compares it with the checksum value calculated by the server. If a mismatch is found between the checksum values, then the client draws up the list of data to be requested for retransmission. The client proceeds to the multi-destination retransmission phase after receiving the "multi-destination delivery end packet". Upon time-out of Tc3, the program ends.

Figure 4:
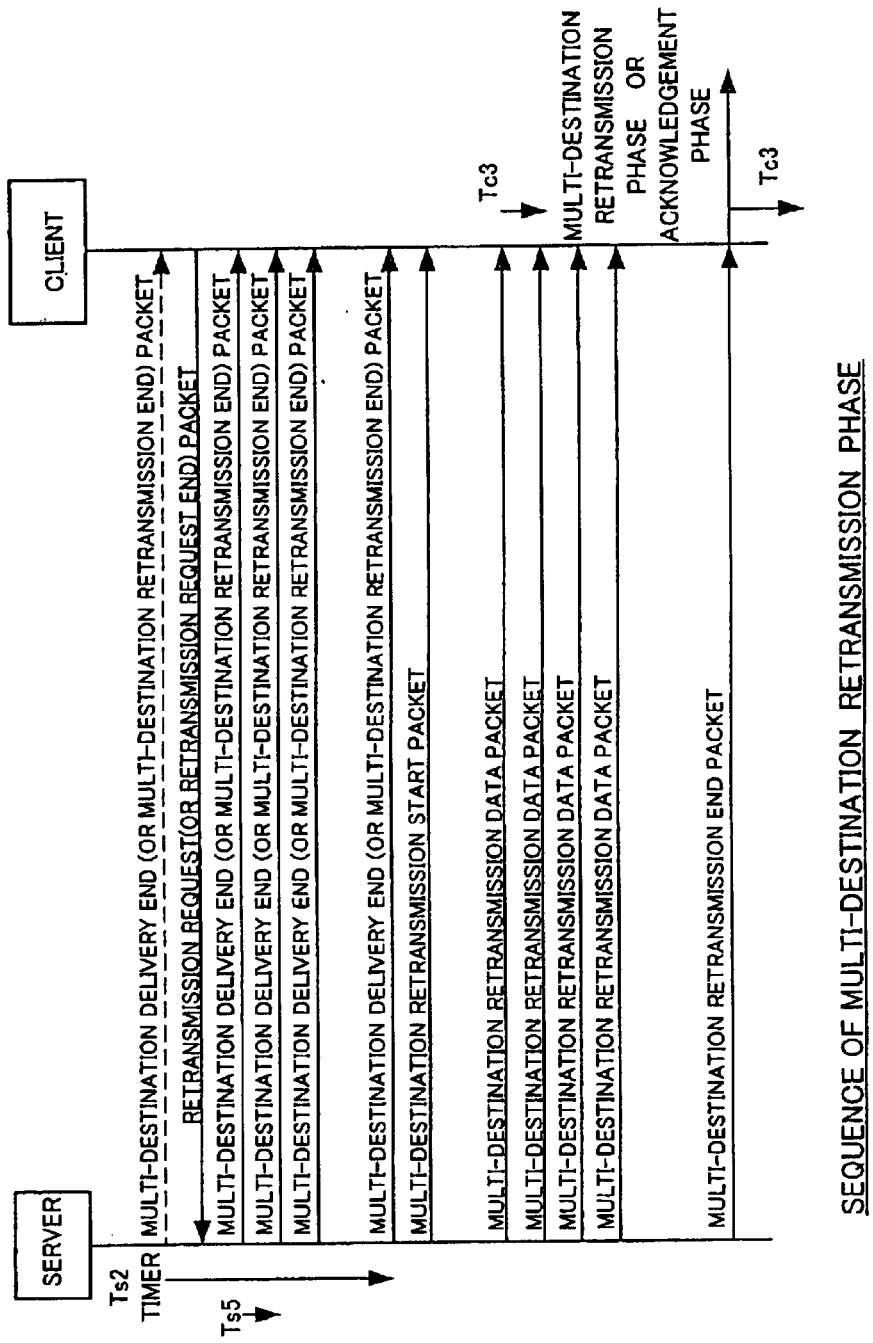
FIG. 4 is a diagram illustrating a sequence of a multi-destination retransmission phase for use in the present invention.

③ Multi-destination Retransmission Phase:

With reference to FIG. 4, after receiving the "multi-destination delivery end packet" or a "multi-destination retransmission end packet", the server waits for a "retransmission requesting packet" and a "retransmission request end packet" from the client until time-out of a Ts2 timer. After time-out of the Ts2 timer, or after receiving the "retransmission request (end) packet" from each client registered in the acknowledgement list, the server draws up retransmission data lists based on omitted-data lists received from the clients, and sends out the "multi-destination retransmission start packet" and the "multi-destination retransmission data packet" to the same multicast addresses as in the multi-destination delivery phase. The multi-destination retransmission phases are repeated a maximum of N2 times until the omitted-data lists of all registered receivers in the acknowledgement list becomes empty or until a time-out of the Ts2 timer occurs. Upon completion of the multi-destination retransmission phase, the server proceeds to the acknowledgement phase. As is the case with the multi-destination delivery phase, different port numbers are used to send out the "multi-destination retransmission data packet" and the "multi-destination retransmission end packet".

Upon detecting an omission of file data, each client draws up a list of data to be requested for retransmission as in the multi-destination delivery phase. Further, as is the case with the multi-destination delivery phase, the client mutually compares for each packet the checksum values calculated by the server and the client, and if a mismatch is found, prepares a list of data to be requested for retransmission. After receiving the "multi-destination delivery end packet" or "multi-destination retransmission end packet" the client sends out a "retransmission request packet" and a "retransmission request end packet" to the server. When no omission of the file data is detected, the client sends out a "retransmission request end packet" composed of only a common header portion. Upon receiving an "acknowledgement start packet", the client proceeds to the acknowledgement phase. The program ends when time-out of Tc3 occurs.

Figure 5:
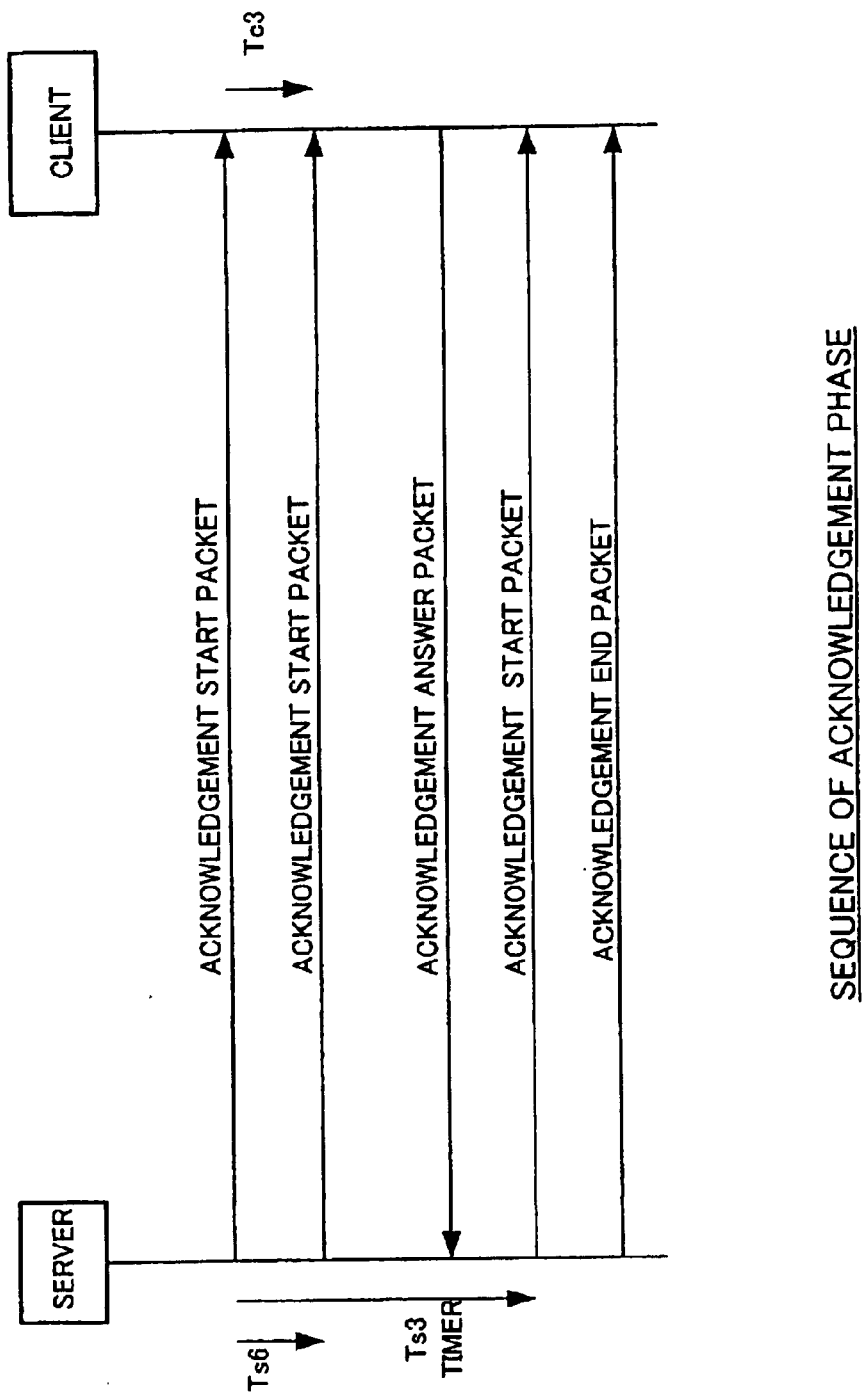
FIG. 5 is a diagram illustrating a sequence of an acknowledgement phase for use in the present invention.

④ Acknowledgement Phase:

This is described with reference to FIG. 5. To ensure reliability in the file transfer, the server makes a check to see if its specified file has been sent out to all the clients registered in the acknowledgement list.

Upon receiving an "acknowledgement start packet", each client sends back an "acknowledgement answering packet" containing the result of confirmation. Incidentally, the program ends upon occurrence of Tc3 time-out.

(4) Packet Format

Figure 6:
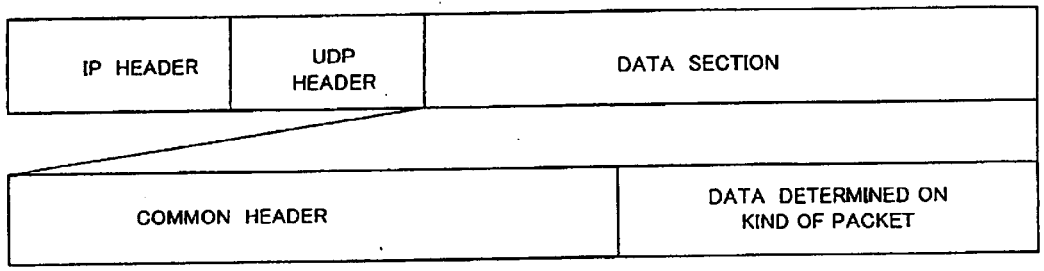
FIG. 6 is a diagram illustrating a basic packet format of an announce registration phase for use in the present invention.
Figure 7:
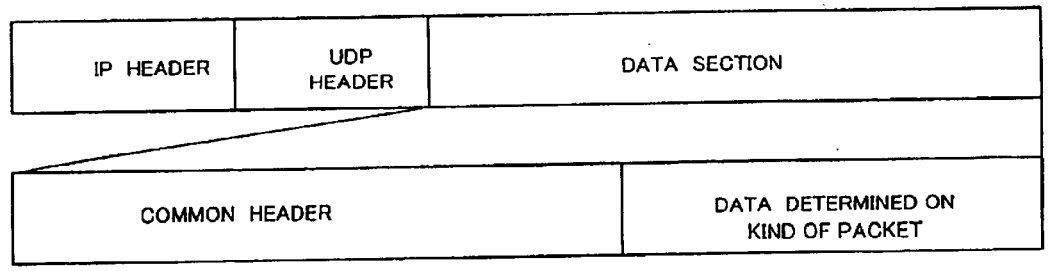
FIG. 7 is a diagram illustrating a basic packet format of the multi-destination delivery phase for use in the present invention.
Figure 8:
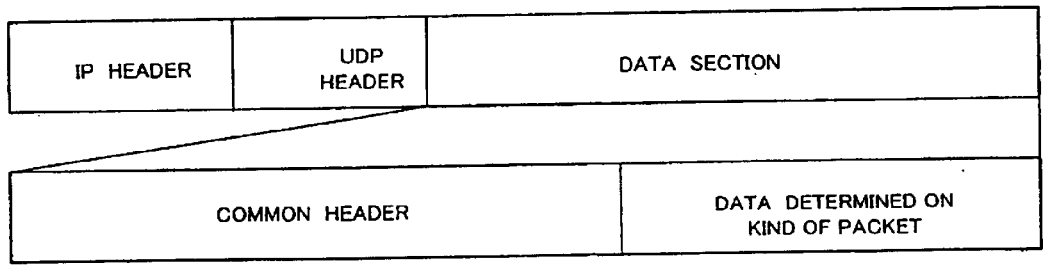
FIG. 8 is a diagram illustrating a basic packet format of the multi-destination retransmission phase for use in the present invention.
Figure 9:
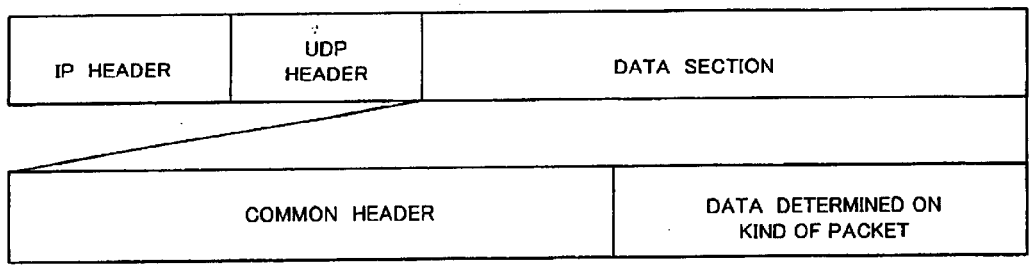
FIG. 9 is a diagram illustrating a basic packet format of the acknowledgement phase for use in the present invention.

FIG. 6 shows a basic packet format in the announce/registration phase; FIG. 7 shows a basic packet format in the multi-destination delivery phase; FIG. 8 shows a basic packet format in the multi-destination retransmission phase; and FIG. 9 shows a basic packet format in the acknowledgement phase.

(5) Common Header

Figure 10:
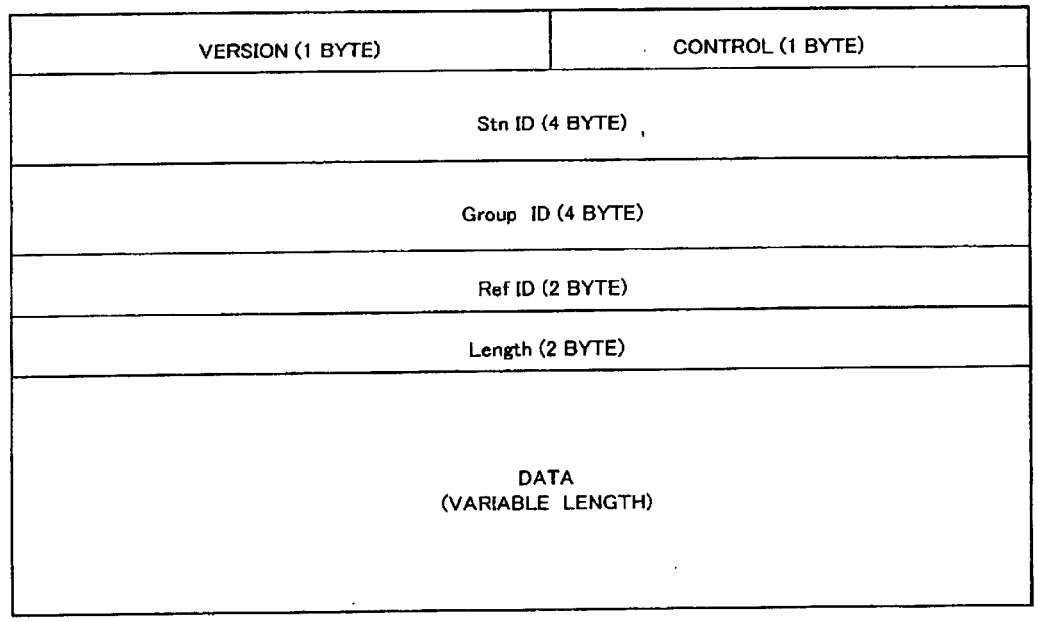
FIG. 10 is a diagram illustrating a header format for use in the present invention.

A detailed description will be given of each field of the common header (MF header) portion. Reference is first made to FIG. 10.

① Version:

This has one-byte-length and is used to identify the version of the protocol.

② Control:

This has one-byte-length and is used to identify the packet shown in Table 1.

TABLE 1

Control Field (Classification of Packet)

Multi-destination delivery start announce packet
Registration packet
File data packet
Multi-destination delivery end packet
Multi-destination retransmission start packet
Multi-destination retransmission end packet
Retransmission request packet
Retransmission request end packet
Multi-destination retransmission data packet
Acknowledgement start packet
Acknowledgement answer packet
Acknowledgement end packet
Inter-user information packet ③ Stn ID:

Stn ID has four-byte-length and is an identifier for specifying the sender of the packet.

④ Group ID:

Group ID has four-byte-length and is employed as an identifier to specify the group of receivers.

⑤ Ref ID:

Ref ID is an identifier for identifying each packet from the start to end of the file transfer, and is a two-byte-length number for preventing duplication of servers. All packets from the start to end of one transfer of any file have the same Ref ID to distinguish from packets of other file transfers. Ref ID has two-byte-length, and hence it can be used 65535 times for transfer of files without duplication, but it is used after being reset under an agreement between the sender and the receiver. Since Ref ID is used to distinguish among file transfers, it is possible to transfer plural files at the same time. When plural senders are present in the same multicast environment, it is necessary to predetermine the range of Ref ID which can be used by each sender.

Figure 11:
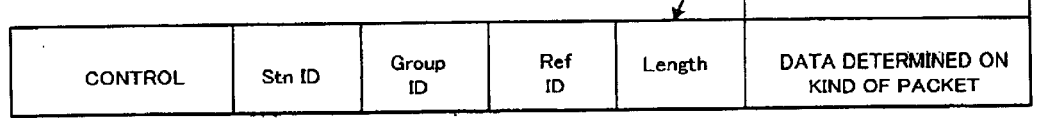
FIG. 11 is a diagram explanatory of a definition of code Length for use in the present invention.

⑥ Length:

Length has a two-byte-length field indicating the length of each packet, that is, indicating the length of information section as depicted in FIG. 11.

(6) Kinds of Packets and their Formats

Figure 12:
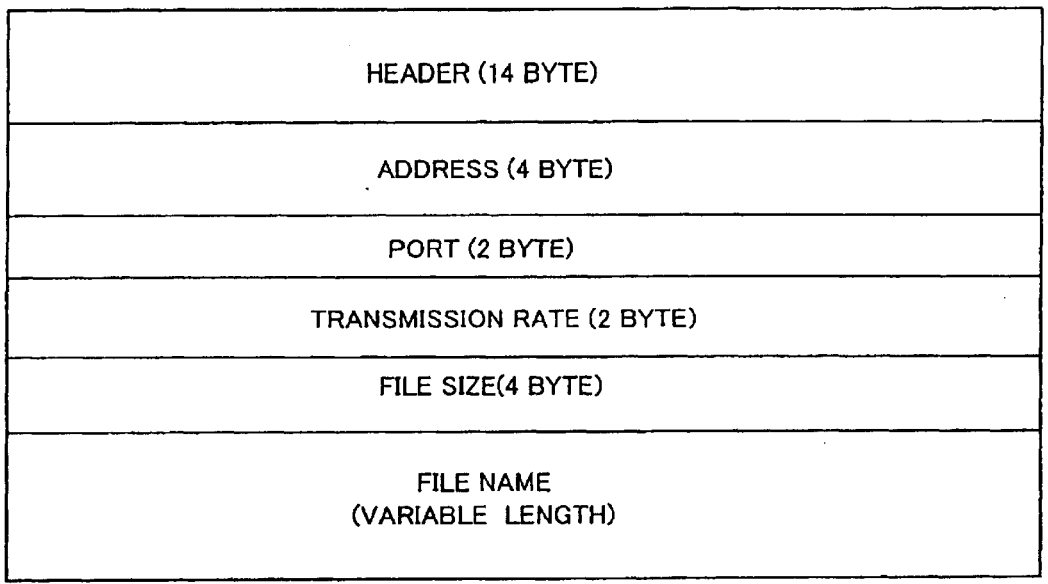
FIG. 12 is a diagram illustrating a multi-destination delivery start announce packet format for use in the present invention.

① Multi-destination Delivery Start Announce Packet:

In an announce/registration phase the server sends out this packet. The packet format is shown in FIG. 12. This packet is used as a signal for indicating the start of the multi-destination delivery. The server periodically sends this packet at regular intervals defined by a Ts4 timer during the announce/registration phase. Based on this packet received first, the client brings Ref ID into correspondence with the multicast address, which are the port number, the transmission rate, the file size and the file name of the "file data packets", received in the multi-destination delivery phase.

Figure 13:
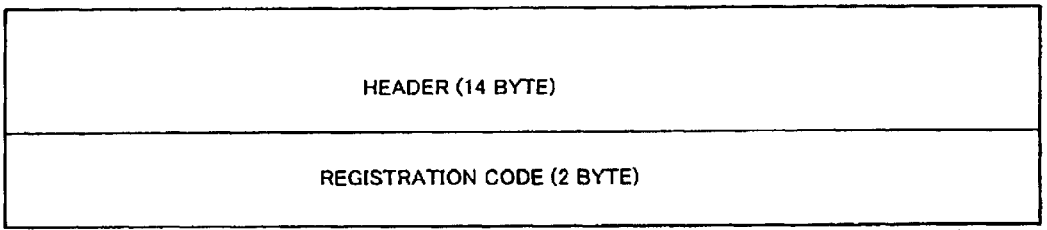
FIG. 13 is a diagram illustrating a registration packet for use in the present invention.

② Registration Packet:

In the announce/registration phase the client sends out this packet. Its packet format is depicted in FIG. 13. This packet is identical in format with the "multi-destination delivery start announce packet" except that the Stn ID of the client is adopted as Stn ID in the common header portion. The client uses this packet to indicate the reception of a file to the server.

The server detects from its received "registration packets" the receivers to be acknowledged, and prepares an acknowledgement list. After the time-out of a Ts1 timer, or after receiving the "registration packets" from the clients belonging to Group ID specified as the destination, the server starts the multi-destination delivery phase.

Figure 14:
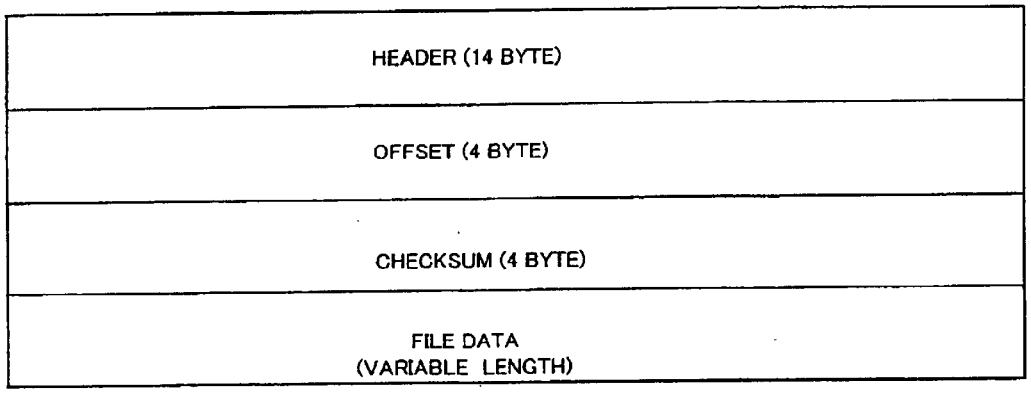
FIG. 14 is a diagram illustrating a format of a file data packet and a multi-destination retransmission end packet for use in the present invention.

③ File Data Packet:

In the multi-destination delivery phase the server sends out this packet. The packet format is depicted in FIG. 14. This packet contains binary data of the file to be transferred and the sequence number used as offset value indicating the position of data in the file, and a checksum value of binary data calculated by the server. The sequence number has four-byte-length, and is an offset value indicating the position where the data being carried by the packet occupies in the file, the offset value being expressed on a byte-wise basis. The client reconstructs the file from the sequence number and the length value in this packet. When an omission of received data is caused by a packet error or loss, the client makes up a retransmission request data list composed of the offset value (the sequence number) of the omitted data and the length value of the omitted data.

Further, the client compares the checksum value sent thereto with the checksum value calculated from its received binary data, deciding whether the packet-wise data transfer is successful or not. When a failure in the data transfer is found by the checksum inspection, the client adds the offset value and length value of the data concerned to the retransmission request data list.

Figure 15:
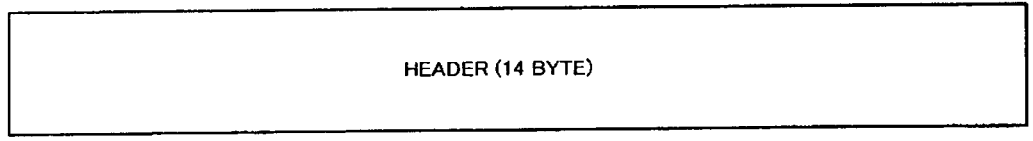
FIG. 15 is a diagram illustrating each format of a multi-destination delivery end packet and a multi-destination retransmission end packet for use in the present invention.

④ Multi-destination Delivery End Packet:

The server sends out this packet in the multi-destination delivery phase. The packet format is shown in FIG. 15. Upon completion of the transmission of all pieces of data, the server sends out this packet as a signal for indicating the start of the multi-destination retransmission phase and starts a Ts2 timer.

The server keeps on sending the "multi-destination delivery end packet" at regular time intervals defined by a Ts5 timer until receiving the "retransmission request end packet" from each receiver registered in the acknowledgement list or until time-out of the Ts2 timer occurs.

Upon first reception of this packet, the client proceeds to the multi-destination retransmission phase on the assumption that the multicast data transmission has terminated. Upon receiving this packet, the client sends back a "retransmission request end packet" to the server.

Figure 16:
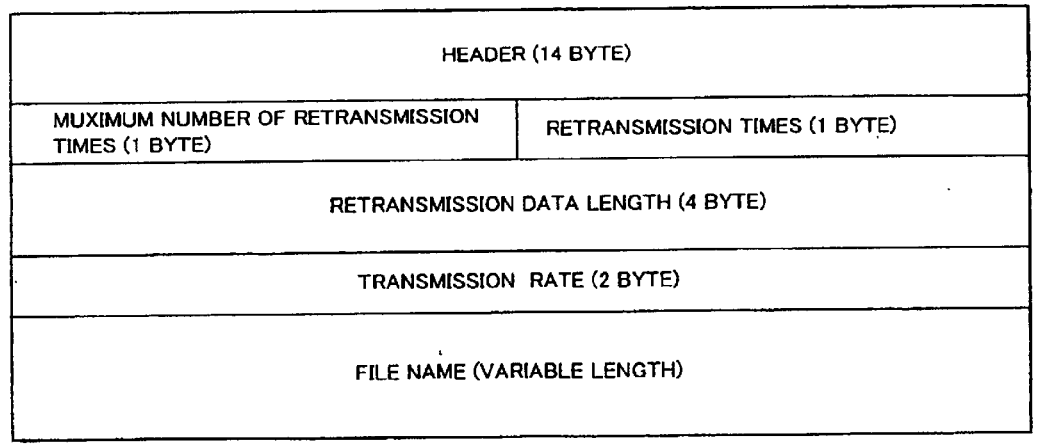
FIG. 16 is a diagram illustrating each format of a multi-destination retransmission start packet and a multi-destination retransmission end packet for use in the present invention.

⑤ Multi-destination Retransmission Start Packet:

The server sends out this packet in the multi-destination retransmission phase. The packet format is shown in FIG. 16. Upon occurrence of time-out of the Ts2 timer, or after receiving a "multi-destination (retransmission) end packet" from each client registered in the acknowledgement list, the server sends out the "multi-destination retransmission start packet" and starts to send out "multi-destination retransmission data packets".

The client interprets the reception of this packet as a signal for indicating the start of the multicast retransmission.

⑥ Multi-destination Retransmission End Packet:

The server sends out this packet in the multi-destination retransmission phase. The packet format is the same as that of the "multi-destination retransmission start packet" depicted in FIG. 16. After sending out all "multi-destination retransmission data packets", the server sends out this packet to indicate the end of the multi-destination retransmission phase to each client, and starts the Ts2 timer.

The server keeps on sending this packet at regular time intervals defined by the Ts5 timer after time-out of the timer Ts2, or until receiving a "retransmission request end packet" from each client registered on the acknowledgement list.

Upon receiving this packet, the client sends back the "retransmission request packet" and the "retransmission request end packet" to the server.

Figure 17:
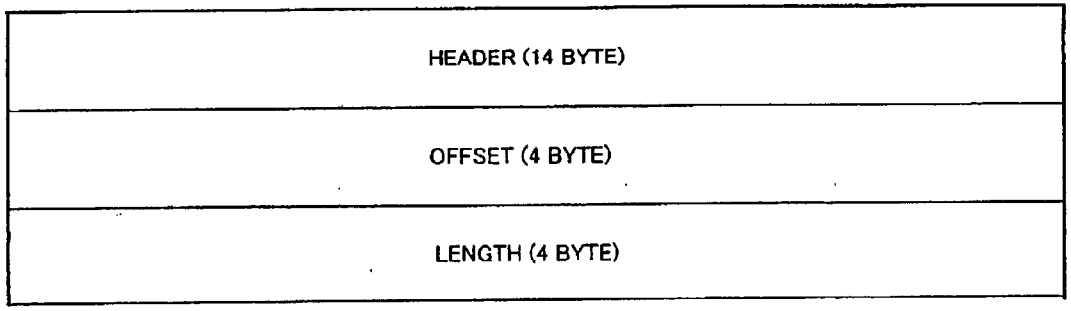
FIG. 17 is a diagram illustrating each format of a retransmission request packet and a retransmission request end packet for use in the present invention.

⑦ Retransmission Request Packet, Retransmission Request End Packet:

The "retransmission request packet" is sent back from each client in the multi-destination retransmission phase. The packet format is shown in FIG. 17. This packet is used to request the retransmission of data which the client could not receive in the multi-destination delivery or retransmission phase.

The client sends to the server a set of (offset value+data length) of omitted data on the basis of the retransmission request data list prepared by the client. A plurality of (offset value+data length) may be contained in this packet.

After receiving the "multi-destination delivery (retransmission) end packet", the server accepts this packet from each client until time-out of the Ts2 timer, and draws up a retransmission request list on the basis of the information of this packet.

In a case where an amount of retransmission-requested data is so large that the "retransmission request packet" is composed of a plurality of packets, each client sends back to the server the first to penultimate packets as "retransmission request packets" and the last packet as the "retransmission request end packet". When the omitted data can be accommodated in one packet, the client sends back only the "retransmission request end packet".

⑧ Multi-destination Retransmission Data Packet:

The server sends out this packet in the multi-destination retransmission phase. The packet format is the same as that of the "file data packet" shown in FIG. 14. Based on the retransmission request list, the server makes up and sends out this packet. Each client uses this packet to complement the omitted data.

⑨ Acknowledgement Start Packet:

In the acknowledgement phase the server sends this packet to each client to demand it to confirm the reception of the data file intended to deliver, and starts a timer Ts3.

Figure 18:
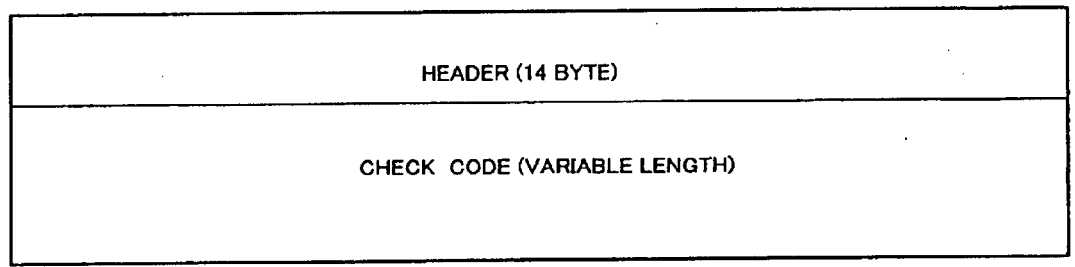
FIG. 18 is a diagram illustrating a format of an acknowledgement start packet for use in the present invention.

The server keeps on sending the acknowledgement start packet at regular time intervals defined by time-out of a Ts6 timer until receiving acknowledgement answer packets from all the receivers registered in the acknowledgement list, or until time-out of the timer Ts3 occurs. The packet format of this packet is shown in FIG. 18.

Upon reception of this packet, each client enters the acknowledgement phase. The client sends back to the server the "acknowledgement answer packet" containing an answer code.

Figure 19:
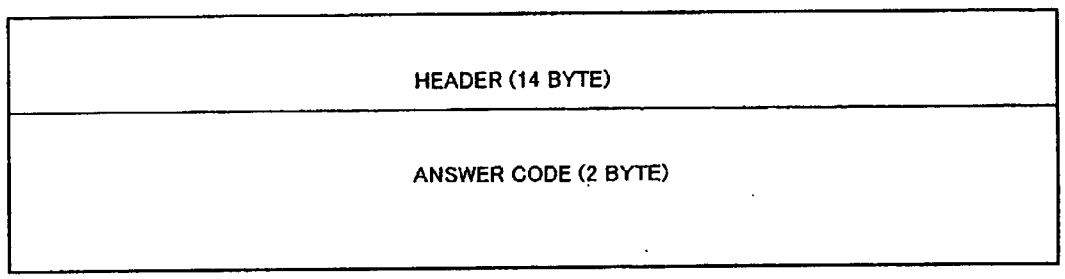
FIG. 19 is a diagram illustrating a format of an acknowledgement answer packet for use in the present invention.

⑩ Acknowledgement Start(Answer) Packet:

In response to the "acknowledgement start packet" at the acknowledgement phase, each client sends back this packet to the server. The packet format is shown in FIG. 19.

Figure 20:
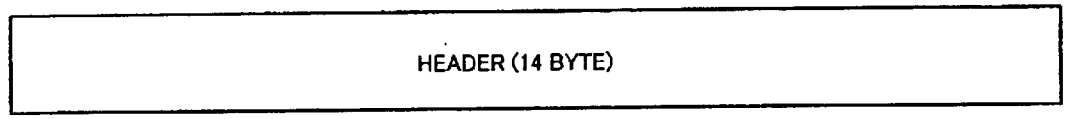
FIG. 20 is a diagram illustrating a format of an acknowledgement end packet for use in the present invention.

⑪ Acknowledgement End Packet:

Upon receiving the acknowledgement answer packet from each client, or upon occurrence of time-out of the Ts3 timer, the server sends out this packet. That packet format is shown in FIG. 20.

(7) Timers

The timer of each client is designated by TcY and the timer of the server by TsX.

TcY is a numerical value which each client calculates by a certain algorithm after receiving the multi-destination delivery start announce packet. On the other hand, TsX is a numerical value which is set by AP and handed to the server.

① Tc3 Timer:

The Tc3 timer is one that is provided on the part of each client, and it is used to ensure completion of the file transfer started by the "multi-destination delivery start announce packet". This timer re-starts each time the client receives an appropriate packet in each phase. And this timer stops when the client receives the next appropriate packet. The client terminates the program upon occurrence of time-out of the Tc3 timer.

② Ts1 Timer:

The Ts1 timer is to set the time for the server to accept the "registration packet" in the announce/registration phase. When this Ts1 timer times out, the server stops to accept the registration packet, and draws up a receiver list and transfers it to AP.

③ Ts2 Timer:

This Ts2 timer is used at the side of the server to define a waiting time for the "retransmission request end packet" from the sending-out time of the "multi-destination delivery end packet" or the "retransmission request end packet". When this Ts2 timer times out, the server starts the next multi-destination retransmission phase.

④ Ts3 Timer:

The Ts3 timer is used by the server in the acknowledgement phase and is started upon sending the first "acknowledgement start packet". This Ts3 timer defines a waiting time for the "acknowledgement answer packet", and stops when the server receives the "acknowledgement answer packet" from all the clients registered in the acknowledgement list. In a case where there is a client which does not send back the "acknowledgement answer packet" even after the time-out of the Ts3 timer, that client is recorded as an acknowledgement failure on a server log.

⑤ Ts4 Timer:

The Ts4 timer defines the time intervals at which the "multi-destination start announce packets" are delivered. The server delivers the "multi-destination delivery start announce packet" at the time intervals defined by the Ts4 timer until the Ts1 timer times out.

⑥ Ts5 Timer:

The Ts5 timer defines the time intervals at which the "multi-destination delivery (retransmission) end packet" is delivered. The server keeps on delivering the "multi-destination delivery (retransmission) end packet" at the time intervals defined by the Ts5 timer until receiving the "retransmission request packets" from all the clients registered in the acknowledgement list, or until the Ts2 timer times out.

⑦ Ts6 Timer:

The Ts6 timer defines the time intervals at which the "acknowledgement start packet" is delivered. The server keeps on delivering the "acknowledgement start packet" at the time intervals defined by the Ts6 timer until receiving the "acknowledgement answer packets" from all the clients registered in the receiver list, or until the Ts3 timer times out.

(8) N2

N2 defines the number of repeating cycles of the multi-destination retransmission phases.

(9) Method for Starting Acknowledgement Procedure

The server sends out the "acknowledgement start packet", and waits for the lapse of a time defined by the Ts3 timer or for sending back of the "acknowledgement answer packets" from all the receivers registered in the acknowledgement list. When "acknowledgement answer packets" are not sent back from all the registered receivers even after a certain elapsed time defined by the Ts6 timer, the server re-sends out the "acknowledgement start packet". As for a client station which does not send back the "acknowledgement answer packet" even after the time-out of the Ts3 timer, an acknowledgement failure is recorded on the log.

An actual method to implement the present invention will be described hereinafter based on the functions described above.

Figure 21A:
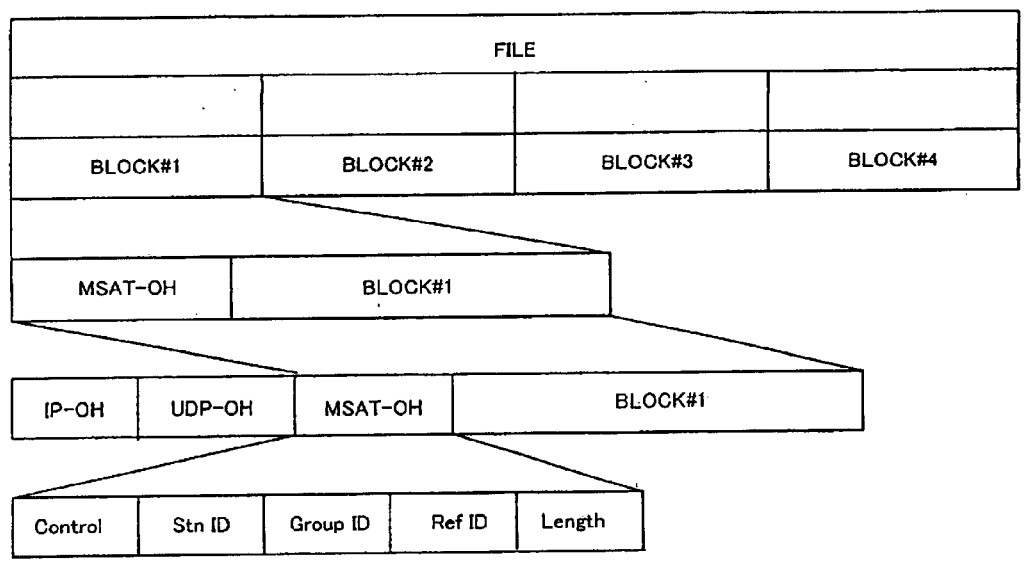
FIGS. 21A and 21B are diagrams illustrating a format of a data delivery packet and a format of a retransmission request packet, respectively, for use in the present invention.

FIG. 21A illustrates the data delivery packet format for use in the multicast file transmission method (also referred to as "MSAT system") according to the present invention. The file is shown to comprise blocks #1, #2, #3 and #4, and the blocks #1 to #4 are each added with an MSAT-OH which is an OH (overhead) for use in communications between transmitting and receiving processors of an MSAT system. Each frame containing this MSAT-OH further contains the UDP (User Datagram Protocol)-OH and the IP-OH which is an OH for IP (Internet Protocol). The MSAT-OH is composed of a control signal "Control", a station identification signal "Stn ID", a group identification signal Group ID, a block identification signal Ref ID, and a block length "Length".

Figure 21B:
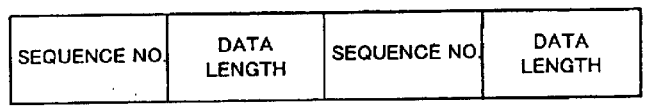

FIG. 21B illustrates the retransmission request (end) packet format of the MSAT system, and the unit of the retransmission request is composed of the sequence number indicating the offset position (4 bytes) and the data length (4 bytes), that is, a total of 8 bytes. Accordingly, in a case of a single error, a retransmission request can be made with a small number of bytes.

[Embodiments]

A description will be given below of the operation for the method of the present invention.

Figure 22:
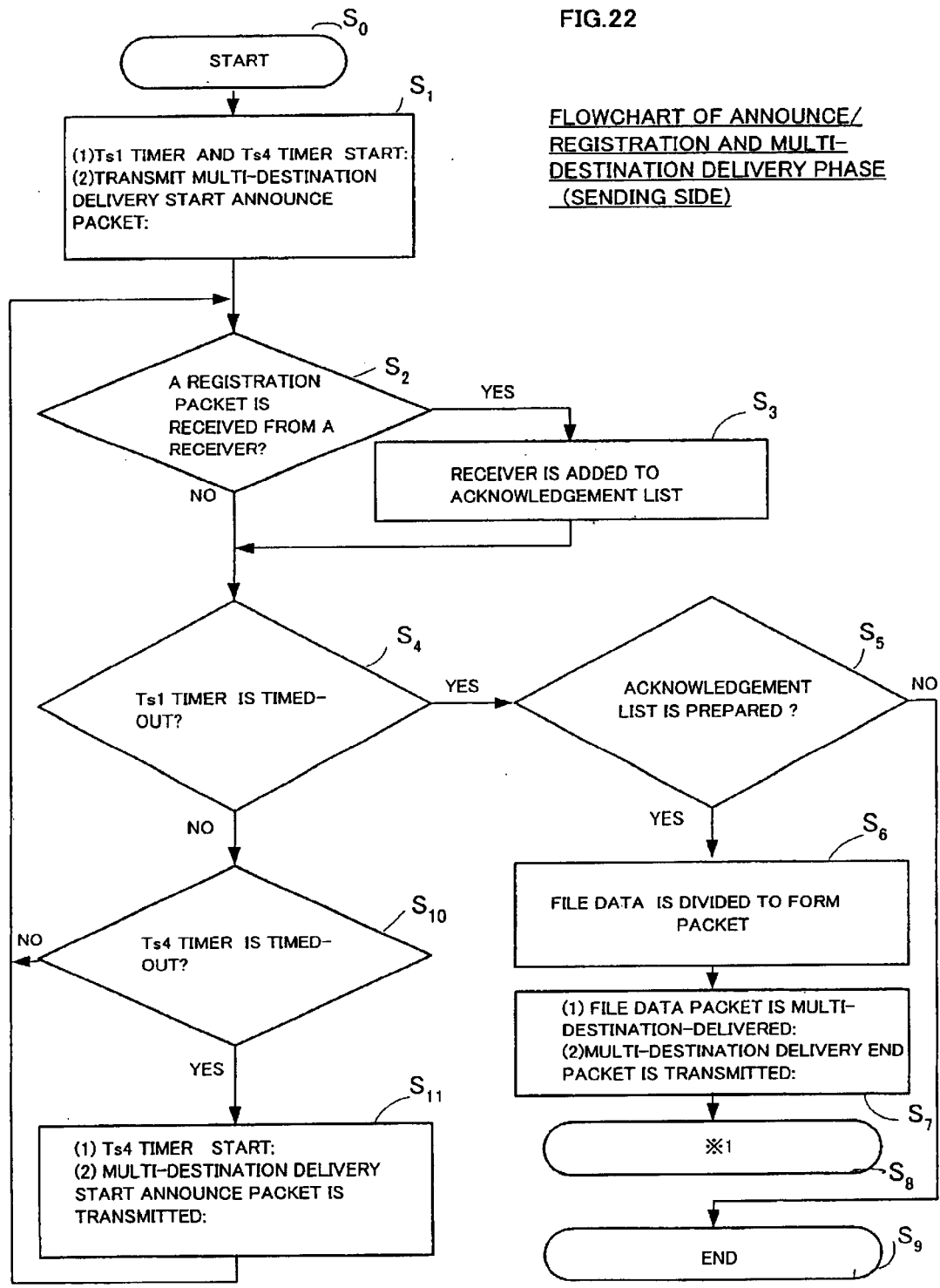
FIG. 22 is a flowchart of the sending side in an announce/registration and multi-destination delivery phase in the present invention.

FIG. 22 is a flowchart, showing operations at sending side in the announce/registration/multi-destination delivery phase and the multi-destination delivery phase, which is explanatory of the start of data transmission.

In this instance, after the start of operation ($S_0$), Ts1 timer and Ts4 timer are started and the "multi-destination delivery start announce packet" are transmitted ($S_1$), and a check is made to see if a "registration packet" has been received ($S_2$) from each receiver. If the result of this check ($S_2$) is YES, the receiver is added to an acknowledgement list ($S_3$), and when the result of the check ($S_2$) is NO or when the check result YES is added to the "acknowledgement list", a check is made to determine if the Ts1 timer has timed out ($S_4$). When the result of this check ($S_4$) is YES, a test is made whether or not an "acknowledgement list" is prepared ($S_5$). When the result of this test ($S_5$) is YES, the file data is divided to provide packets ($S_6$), which are followed by transmission of the "multi-destination delivery end packet" after the multi-destination delivery of the "file data packet" ($S_7$), and then the procedure proceeds to the operation of the retransmission phase ($\cancel{X}1$). In step $S_4$, when the check result is NO indicating that the Ts1 timer has not timed out, a check is made to see if the Ts4 timer has timed out ($S_{10}$). When the result of this check ($S_{10}$) is YES, the Ts4 timer is restarted and the "multi-destination delivery start announce packet is transmitted ($S_{11}$), and when the result of the check ($S_{10}$) is NO, the procedure goes back to step ($S_2$) in which to make a check to see if the "registration packet" has been received from any of the receivers. When the result of the check $S_5$ is NO indicating that no acknowledgement list" is not generated, the procedure ends (S9).

Figure 23:
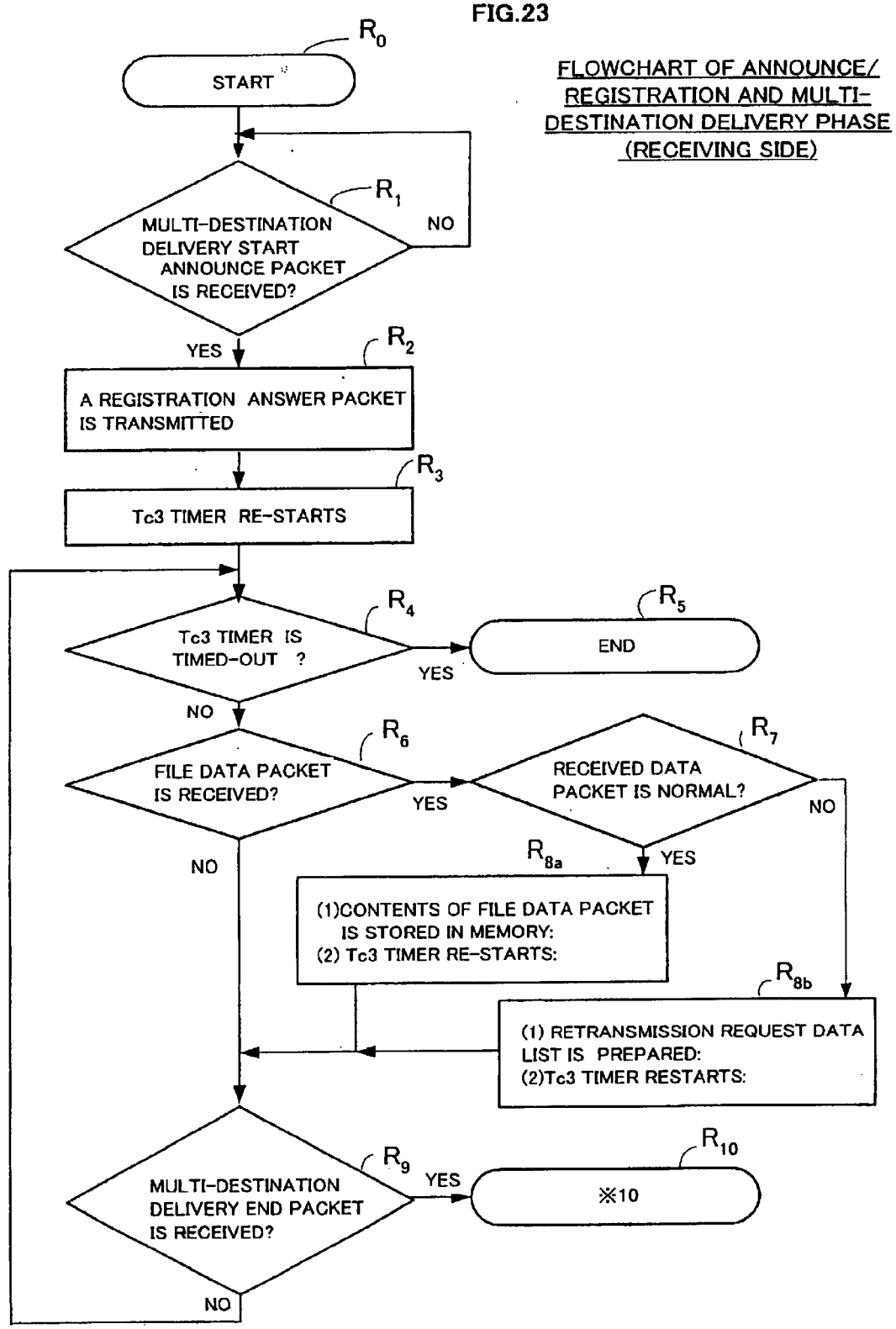
FIG. 23 is a flowchart of the receiving side in an announce/registration and multi-destination delivery phase in the present invention.

FIG. 23 is a flowchart showing the operations at the receiving side in the announce/registration/multi-destination delivery phase.

In this instance, after the start of operation ($R_0$), a check is made to see if the "multi-destination delivery announce packet" is received ($R_1$), and when the result of this check ($R_1$) is YES, the "registration packet" is sent out ($R_2$) and the Tc3 timer is started ($R_3$), and a check is made to see if the Tc3 timer has timed out ($R_4$). If the result of this check ($R_4$) is YES, this phase ends (Rs). When the result of the check ($R_4$) is NO, a check is made to see if the "file data packet" has been received ($R_6$), and when the check result of the step ($R_6$) is YES, a check is made to see if the "file data packet" is normal ($R_7$). When the check result of the step ($R_7$) is YES, the contents of the "file data packet" are stored in a memory and the Tc3 timer is restarted ($R_{8a}$) When the check result of the step ($R_7$) is NO, a retransmission request data list is prepared and the Tc3 timer is restarted ($R_{8b}$). As mentioned above, when Tc3 timer is restarted or when the check result of the step ($R_6$) is NO, a check is made to determine whether or not the "multi-destination delivery end packet" has been received ($R_9$). When the check result ($R_9$) is YES, the procedure is shifted to a retransmission phase ($\cdot$X$\cdot$10), while when the check result ($R_9$) is NO, the procedure goes back to step ($R_5$).

Figure 24:
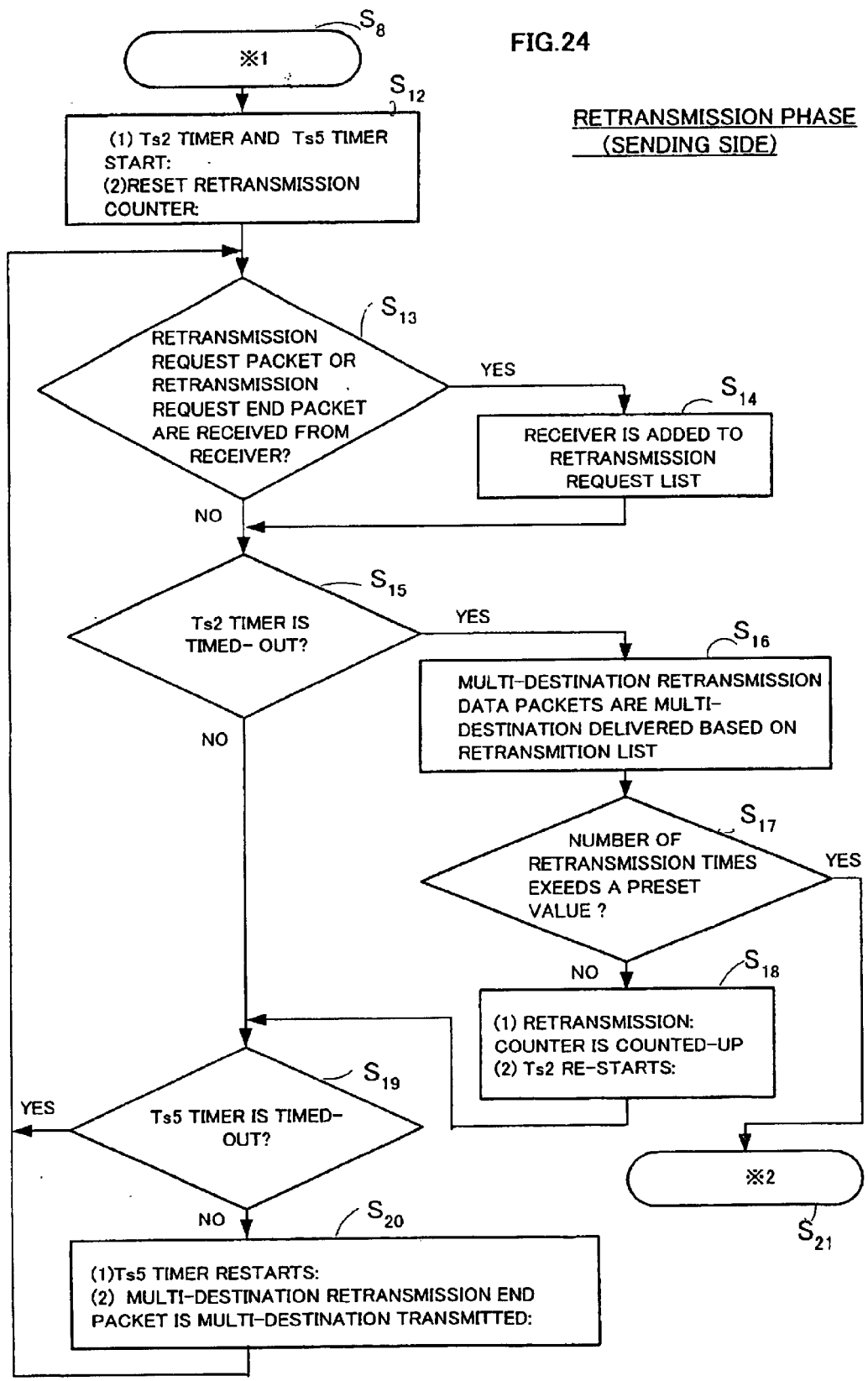
FIG. 24 is a flowchart of the sending side in a retransmission phase in the present invention.

FIG. 24 is a flowchart showing operations at the sending side in the retransmission phase.

In this instance, when the operation of the retransmission phase ($\cdot$X$\cdot$1) is started ($S_8$), a Ts2 timer and a Ts5 timer are started ($S_{12}$). Then a check is made to see if the "retransmission request packet" or the "retransmission request packet" has been received ($S_{13}$). In a case where the result of this check ($S_{13}$) is YES, when the receiver is added to a "retransmission request list" ($S_{14}$), or when the result of the check ($S_{13}$) is NO, a check is made to determine whether or not the Ts2 timer has timed out ($S_{15}$). If the result of this check ($S_{15}$) is YES, "multi-destination retransmission data packets" are multi-destination delivered on the base of the retransmission request list ($S_{16}$), and then a check is made to see if the retransmission count is in excess of a preset value of N2 ($S_{17}$). If the result of this check ($S_{17}$) is YES, the sending side proceeds to the operation of the "acknowledgement phase" (*2) ($S_{21}$). In a case where the result of the check ($S_{17}$) is NO, when a counter (referred to "retransmission counter") for counting the number of retransmission times is counted up and the Ts5 timer is restarted ($S_{18}$), or when the result of the check ($S_{15}$) is NO, a check is made to see if the Ts5 timer has timed out ($S_{19}$). When the result of this check ($S_{19}$) is YES, or when the result of this check ($S_{19}$) is NO while the Ts5 timer is restarted and the "multi-destination retransmission end packet" ($S_{20}$) is sent out, the procedure goes back to step $S_{13}$.

Figure 25:
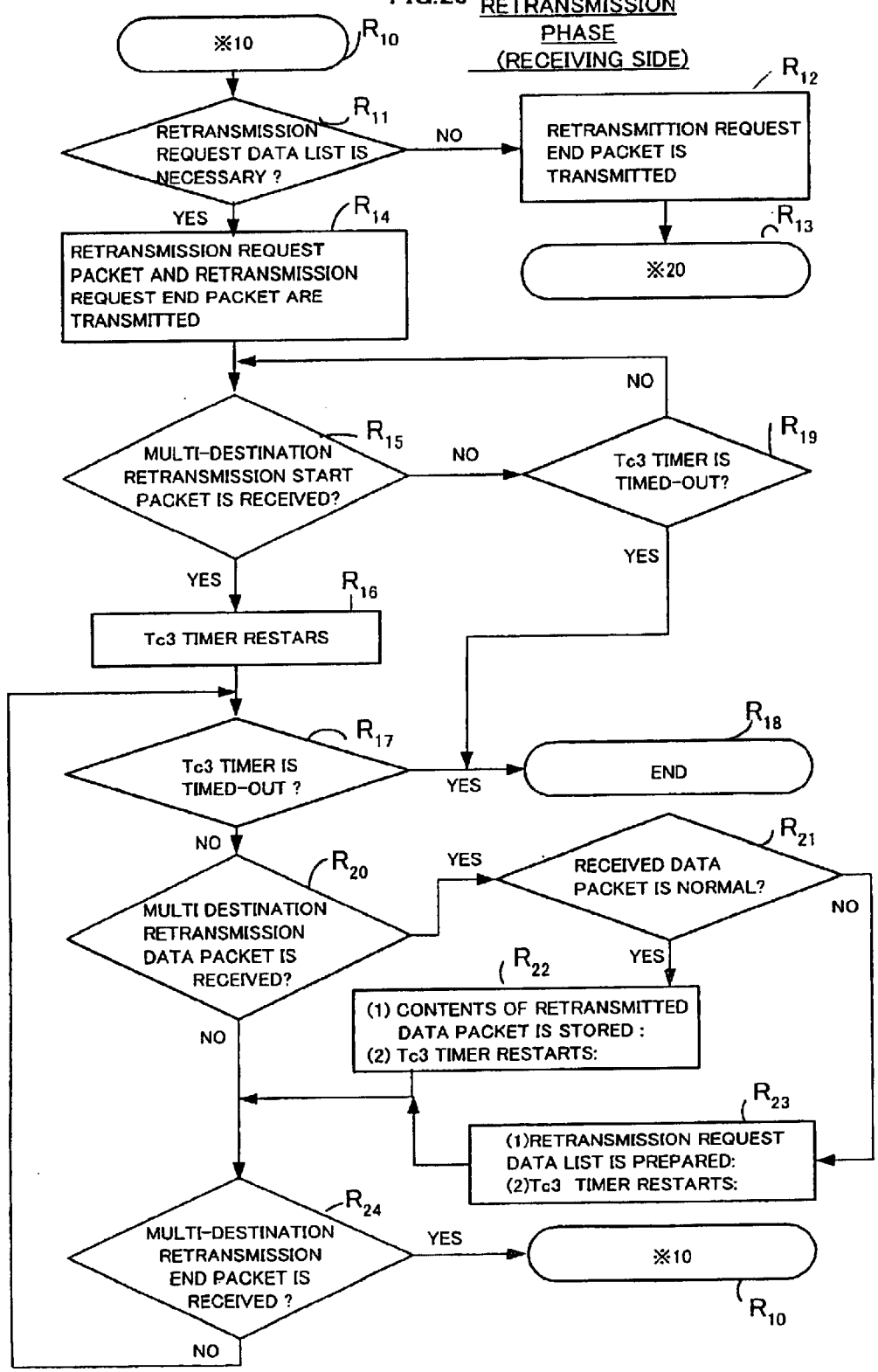
FIG. 25 is a flowchart of a receiving side in a retransmission phase in the present invention.

FIG. 25 is a flowchart illustrating operations at the receiving side in the retransmission phase.

In this instance, upon starting the operation ($\cdot$X$\cdot$10) of the retransmission phase ($R_{10}$), a check is made to see if there is prepared the "retransmission request data list" ($R_{11}$), and if the result of this check ($R_{11}$) is NO, the receiving side sends out a "retransmission request end packet" ($R_{12}$), and proceeds to the operation ($\cdot$X$\cdot$20) of the "acknowledgement phase" ($R_{13}$). When the result of the check at the step ($R_{11}$) is YES, the "retransmission request packet" and the "retransmission request end packet" is sent out ($R_{14}$), and a check is made to see if the multi-destination retransmission start packet" has been received ($R_{15}$). When the result of this check at the step ($R_{15}$) is YES, the Tc3 timer is restarted ($R_{16}$) and a check is made to see if the Tc3 timer has timed out ($R_{17}$); when the result of this check at the step ($R_{17}$) is YES, the operation ($\cdot$X$\cdot$10) of this retransmission phase ends ($R_{17}$). When a result of the check at the step ($R_{15}$) is NO, a check is made to see if the Tc3 timer is timed out ($R_{19}$). When a result of the check at the step ($R_{19}$) is YES, the operation ($\cdot$X$\cdot$10) of this retransmission phase terminates ($R_{18}$). On the contrary, when a result of the check at the step ($R_{19}$) is NO, the operation ($\cdot$X$\cdot$10) of this retransmission phase returns to the step ($R_{15}$).

When the result of this check ($S_{17}$) is NO, a check is made to see if the "multi-destination retransmission data packet" has been received ($R_{20}$). If the result of this check ($R_{20}$) is YES, a check is made to see if the "multi-destination retransmission data packet" received is normal ($R_{21}$). If the result of this check ($R_{21}$) is YES, the contents of the "multi-destination retransmission data packet" are stored in a memory and the Tc3 timer is restarted ($R_{22}$). When the result of this check ($R_{21}$) is NO, a retransmission request data list is prepared and the Tc3 timer is restarted ($R_{23}$). When the result of the check ($R_{20}$) is NO, or when the operations in the step $R_{22}$ or $R_{23}$ are completed, a check is made to see if the "multi-destination retransmission end packet" has been received ($R_{24}$). When the result of this check ($R_{24}$) is YES, the operation ($\cdot$X$\cdot$10) of the retransmission phase is performed again ($R_{10}$), and when the result of the check ($R_{20}$) is NO, the receiving side goes back to step ($R_{17}$).

Figure 26:
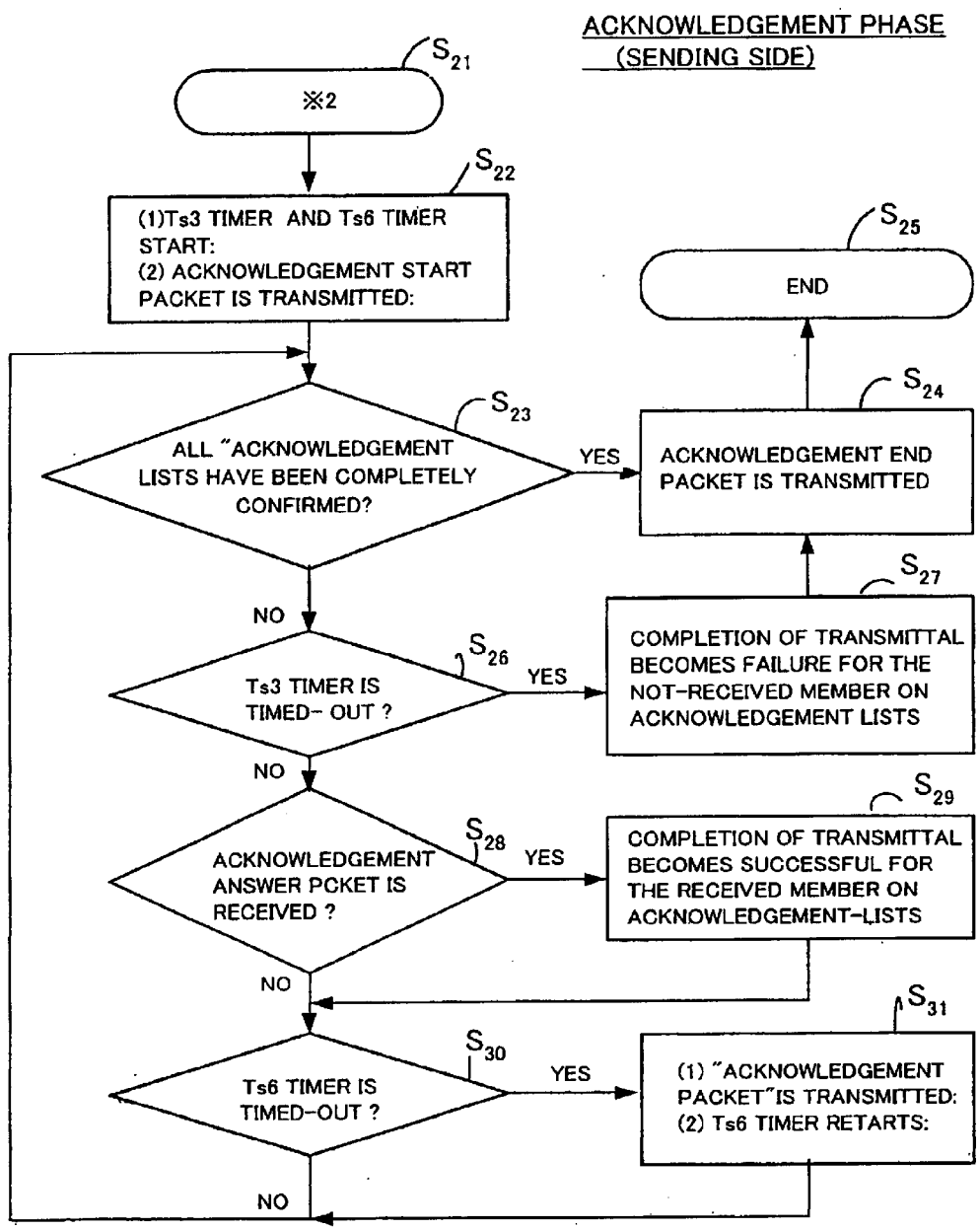
FIG. 26 is a flowchart of a sending side in an acknowledgement phase in the present invention.

FIG. 26 is a flowchart illustrating operations at the sending side in the acknowledgement phase.

In this instance, when the operation ($\cdot$X$\cdot$2) of the acknowledgement phase is started ($S_{21}$), Ts3 timer and Ts6 timer are started and the "acknowledgement start packet" is transmitted ($S_{22}$), then a check is made to see if all the acknowledgement lists have been completely confirmed ($S_{23}$). If the result of this check at the step ($S_{23}$) is YES, the operation of the acknowledgement phase ends ($S_{25}$) after the "acknowledgement end packet" is transmitted ($S_{24}$). When the result of the check ($S_{23}$) is NO, a check is made to see if the Ts3 timer is timed out ($S_{26}$). When the result of the check ($S_{26}$) is YES, the sending side decides that the completion of transmittal becomes failure for the non-received member for whom the acknowledgement has not completed on the acknowledgement-lists ($S_{27}$), and then the "acknowledgement packet" is sent out ($S_{24}$) and the operation of the acknowledgement phase ends ($S_{25}$). When a result of the check at the step ($S_{26}$) is NO, a check is made to see if an "acknowledgement answer packet" is received ($S_{28}$). When a result of the check at the step ($S_{28}$) is YES, the sending side decides that the completion of transmittal is successful for the received member on the acknowledgement-lists ($S_{29}$). After completion of the operation of the step ($S_{29}$) or when a result of the check at the step ($S_{28}$) is NO, a check is made to see if Ts6 timer is timed out ($S_{30}$). When the result of this check ($S_{30}$) is YES, the "acknowledgement packet" is sent out and the Ts6 timer is restarted ($S_{30}$). When a result of the check at the step ($S_{30}$) is NO, or when the operation at the step ($S_{30}$) is completed, the sending side returns to step ($S_{23}$).

Figure 27:
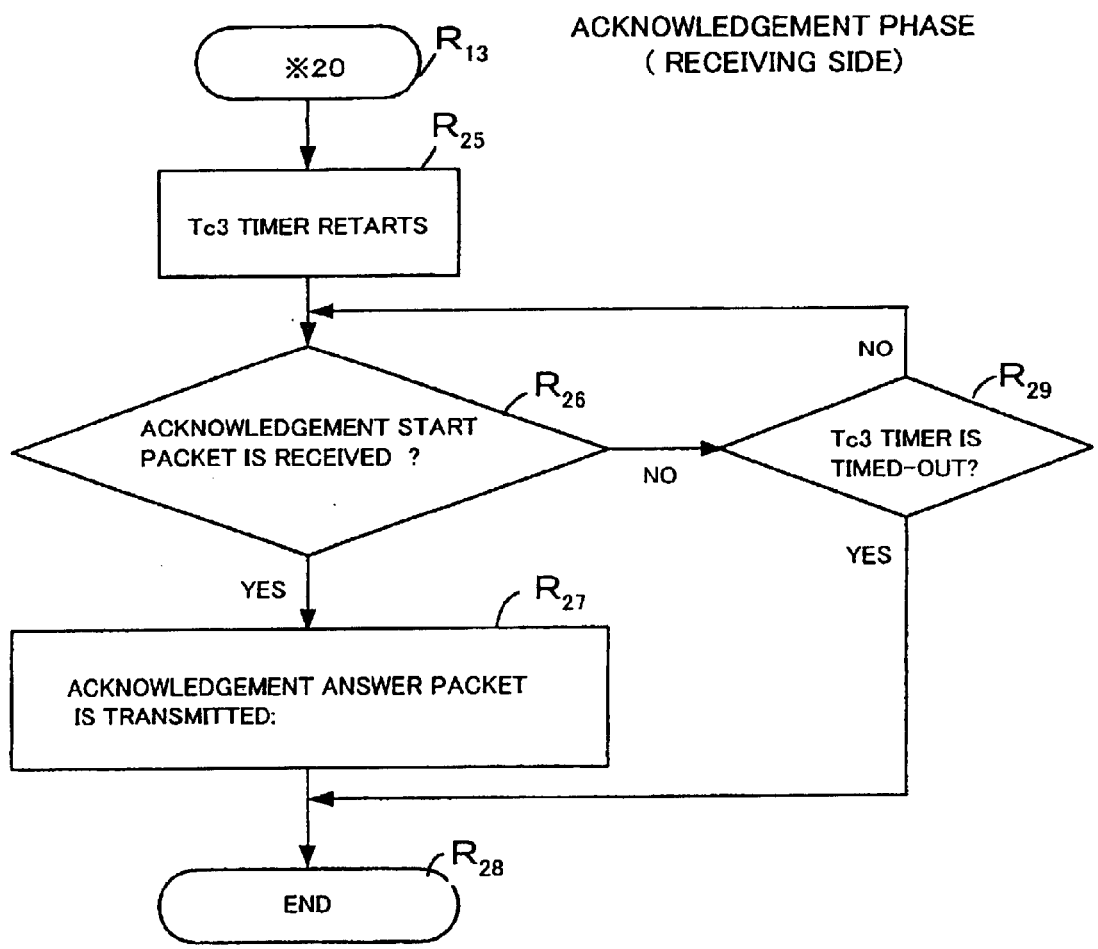
FIG. 27 is a flowchart of a receiving side in an acknowledgement phase in the present invention.
Figure 28A:
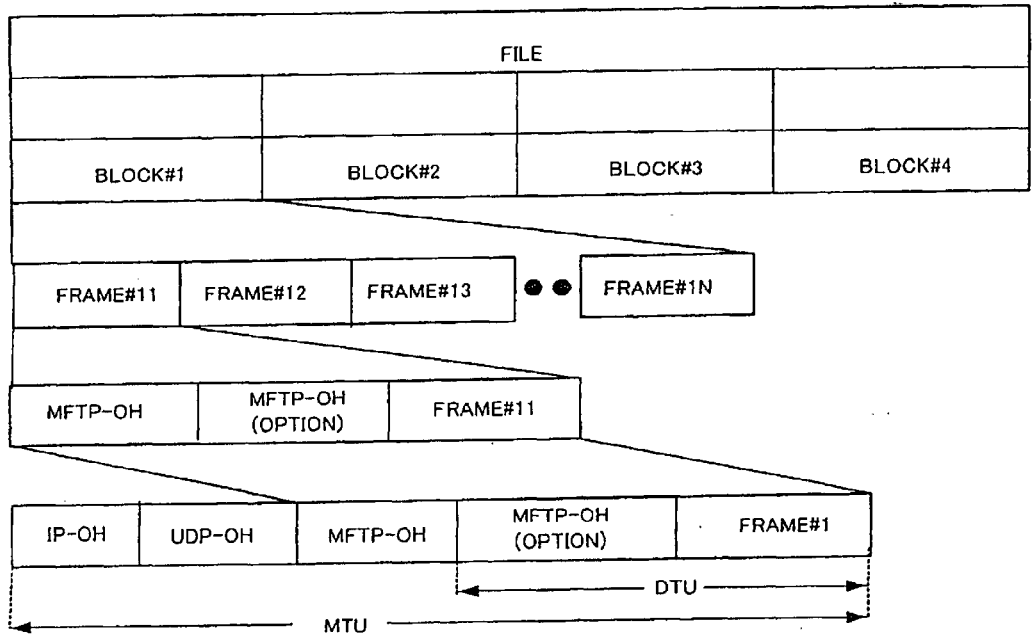
FIG. 28 is a diagram illustrating a format of a data delivery packet (a) and a format of a retransmission request packet (b) in a conventional method.
Figure 28B:
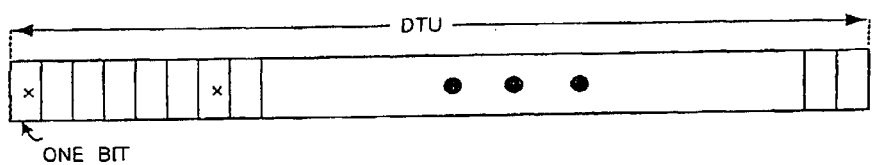

FIG. 27 is a flowchart illustrating operation at the receiving side in the acknowledgement phase. In this instant, when the operation ($\cdot$X$\cdot$20) of the acknowledgement phase is started ($R_{13}$), Tc3 timer is restarted ($R_{25}$) and a check is made to see if the "acknowledgement start packet" has received ($R_{26}$). When a result of this check at the step ($R_{26}$) is YES, the "acknowledgement answer packet is transmitted ($R_{27}$), with which the operation (X20) is terminated ($R_{28}$). When a result of this check at the step ($R_{26}$) is NO, a check is made to see if Tc3 timer is timed out ($R_{29}$). When a result of this check at the step ($R_{29}$) is NO, the operation is returned to the step ($R_{26}$). When a result of this check at the step ($R_{29}$) is YES, the operation (X20) is terminated ($R_{28}$).

Figure 30:
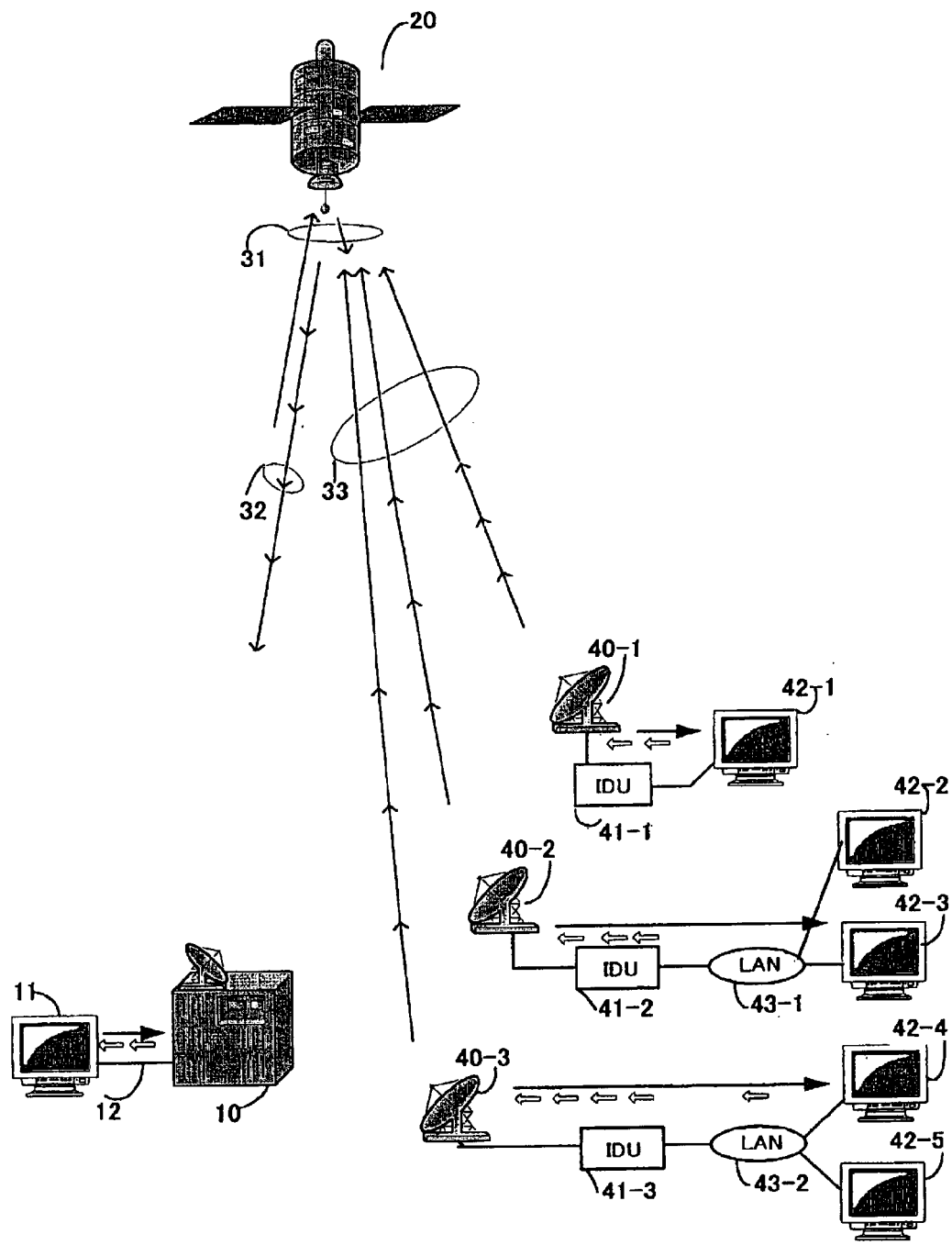
FIG. 30 is a system diagram showing an example of a two-way communication service system using a communication satellite, which embodies the present invention.

FIG. 30 is an actual embodiment of the present invention, in which a request numeral 10 is a hub-station used as the sending side, 11 a host-server (e.g.: a personal computer) of the client, which is connected to the hub-station 10 via a leased line 12; 20 a communication satellite; 31 a time-division-multiple path (e.g.: 2 mega bit/sec at most) from the hub-station 10 to the communication satellite 20; 32 and 33 each a time-division-multiple-access path (e.g.: 150 kilo-bit/sec); 40-1,40-2 and 40-3 each a very small terrestrial station; 41-1, 41-2 and 41-3 each In Door Unit (IDU); 42-1,42-2,42-3,42-4 and 42-5 each a client device (e.g.: a personal computer) of each client; 43-1 and 43-2 each a LAN (Local Area Network).

In a two-way communication service by the use of a communication satellite exemplified in FIG. 30, unlike in a one-way satellite communication service, the effective use (by shortening the "retransmission request packet") of the up-link circuit (remote site→hub station) leads to reduction of the network cost, and hence it is very important; therefore, this invention method which permits reduction of the "retransmission request packet" is suitable for use in such a two-way communication service.

As described above in detail, this invention provides such merits as listed-up below.

(1) In the conventional MFTP system in which a data error is expressed by a bit map, even if only one DTU is erroneous, it is necessary to send a retransmission request packet composed of a bit map (which usually has a size of one MTU (=1500 bytes) corresponding to one block. In contrast to this, according to the multicast file transmission method of the present invention (MSAT system), since an error is expressed by the "offset position (4)"+"data length (4)" (a total of 8 bytes), it is possible, for a single error and successive errors, to request its retransmission with a small number of bytes.

Figure 29:
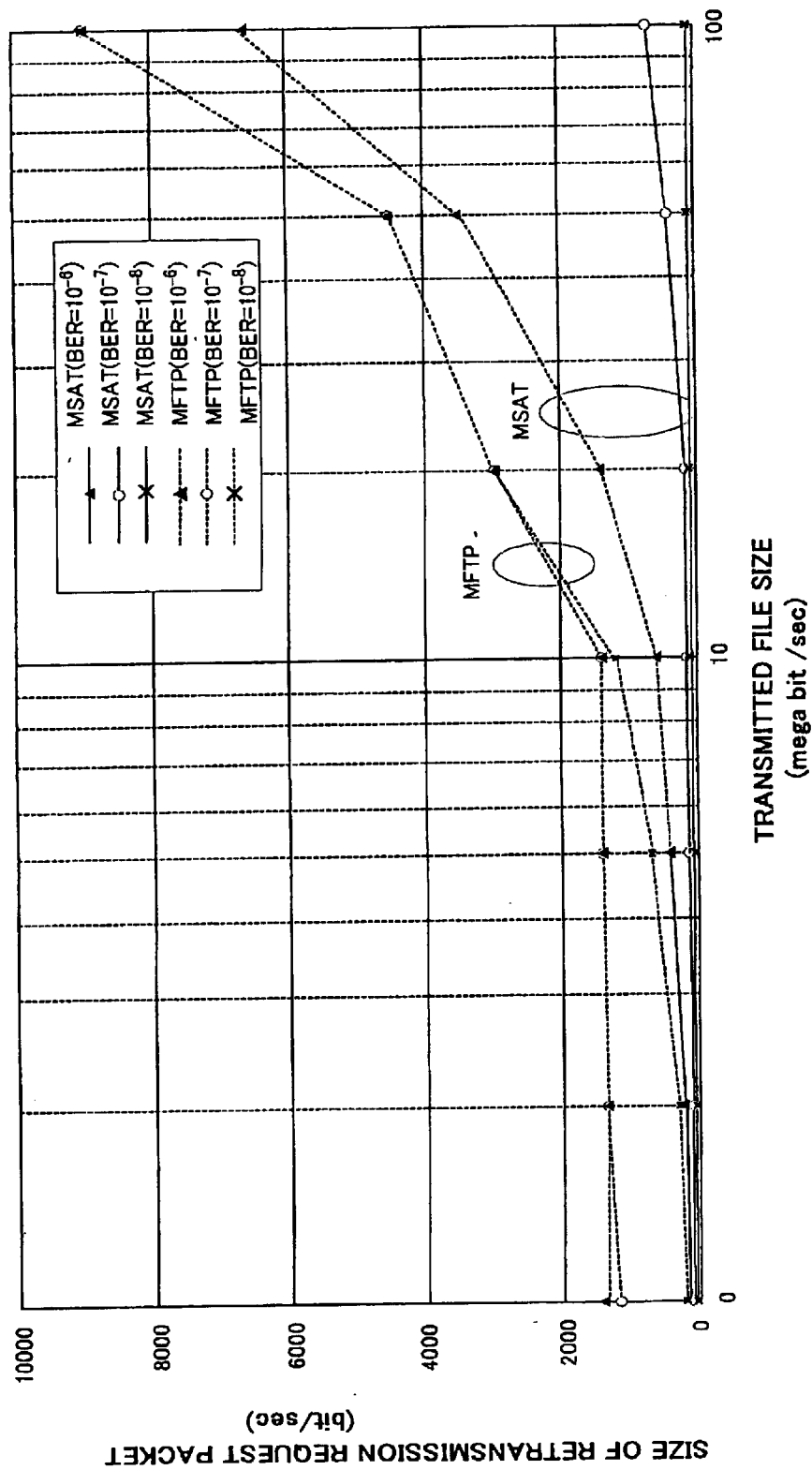
FIG. 29 is a diagram illustrating, in comparison the present invention with a conventional method, relationships of the circuit error rates with respect to the transmission file size and the sum of the sizes of retransmission request packets at one receiving station.

(2) Recently communication circuits, including a satellite communication circuit, have moved up in quality and are substantially error-free or their failure is very rare, in which case the MSAT system according to the present invention permits transmission of the retransmission request packet more efficiently than the conventional MFTP system. FIG. 29 shows the sum total of sizes of retransmission request packets at one receiving station with respect to the transmission file size and circuit bit error rate indicated. In practice, errors in the satellite communication circuit often occur on a block-wise basis; according to the MSAT system, when errors occur in blocks consecutively, it is possible to make the retransmission request for a plurality of "file data packets" with a single "offset position (4)" +"data length (4)", providing increased efficiency in the transmission of the retransmission request packet.

(3) In this invention method, there is apprehension that the number of "retransmission request packets" increases when the line quality is extremely low, but it is possible to reduce such a risk by such a limitation that no retransmission request is made when the number of error packets is larger than a predetermined value.

What we claim is:

1. A multicast file transmission method, comprising:

transmitting a data file composed of a plurality of blocks from a sending side to respective receiving destinations;

testing, at said respective destinations, whether or not any transmitted packet is found erroneous in the data file composed of a plurality of blocks after the end of said transmission of the data file;

transmitting to said sending side from any of said respective receiving destinations, where any transmitted packet is found erroneous by said testing in the data file composed of a plurality of blocks after the end of said transmission of the data file, a request-for-retransmission signal for requesting retransmission of the transmitted packet of data found erroneous in said data file received at said any of respective receiving destinations, said request-for-retransmission signal being defined to indicate the offset position of said erroneous data in said transmitted packet of data and the data length of said erroneous data; and retransmitting the transmitted packet of data found erroneous from the sending side to said any of said respective receiving destination in a multi-destination retransmission phase starting in response to said request-for-retransmission signal.

2. A multicast file transmission method as claimed in claim 1, in which said request-for-retransmission signal is defined to send a total of 8 bytes composed of 4 bytes representative of the offset position of said transmission packet of said erroneous data and 4 bytes representative of the length of said erroneous data.

* * * * *